(12) United States Patent
Doh

(10) Patent No.: US 10,957,100 B2
(45) Date of Patent: Mar. 23, 2021

(54) METHOD AND APPARATUS FOR GENERATING 3D MAP OF INDOOR SPACE

(71) Applicant: Korea University Research and Business Foundation, Seoul (KR)

(72) Inventor: Nak Ju Doh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/269,649

(22) Filed: Feb. 7, 2019

(65) Prior Publication Data

US 2019/0311533 A1 Oct. 10, 2019

(30) Foreign Application Priority Data

Apr. 6, 2018 (KR) .................. 10-2018-0040660
Sep. 28, 2018 (KR) .................. 10-2018-0116195

(51) Int. Cl.
*G06T 15/00* (2011.01)
*G06T 17/05* (2011.01)
(Continued)

(52) U.S. Cl.
CPC .............. *G06T 17/05* (2013.01); *G01C 11/04* (2013.01); *G06T 7/194* (2017.01); *G06T 7/50* (2017.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

| 2012/0319596 A1* | 12/2012 | Nanahara | H05B 47/105 |
| | | | 315/153 |
| 2015/0095350 A1* | 4/2015 | Chen | G06F 16/29 |
| | | | 707/749 |
| 2016/0005229 A1* | 1/2016 | Lee | G06F 3/0488 |
| | | | 345/419 |

FOREIGN PATENT DOCUMENTS

| KR | 10-2014-0058861 A | 5/2014 |
| KR | 10-2014-0076506 A | 6/2014 |
| | (Continued) | |

OTHER PUBLICATIONS

Zheng, Ke Colin et al., "Layered Depth Panoramas", *2007 IEEE Conference on Computer Vision and Pattern Recognition*, 2007 (pp. 1-8).

(Continued)

*Primary Examiner* — Gordon G Liu
(74) *Attorney, Agent, or Firm* — NSIP Law

(57) ABSTRACT

According to an exemplary embodiment of the present disclosure, a three-dimensional map generating method of an indoor space, includes: obtaining at least one indoor space image which is an image for an indoor space; distinguishing a background area corresponding to a structure of the indoor space from a non-background area corresponding to objects located in the indoor space in the at least one indoor space image; generating at least one expanded indoor space image by expanding the background area to the non-background area in the at least one indoor space image; generating depth-image associated information based on at least one expanded indoor space image and geographic information including information of a depth value for the indoor space; and generating a three-dimensional map for the indoor space using the at least one expanded indoor space image, the geographic information, and the depth-image associated information.

22 Claims, 17 Drawing Sheets

(51) Int. Cl.
  *G06T 7/194* (2017.01)
  *G06T 7/50* (2017.01)
  *G06T 7/70* (2017.01)
  *G01C 11/04* (2006.01)

(52) U.S. Cl.
  CPC ...... *G06T 7/70* (2017.01); *G06T 2207/10028* (2013.01)

(58) Field of Classification Search
  USPC ........................................................ 345/419
  See application file for complete search history.

(56) References Cited

FOREIGN PATENT DOCUMENTS

KR   10-2017-0007098 A   1/2017
KR   10-2017-0008505 A   1/2017

OTHER PUBLICATIONS

Lee, Soon-Young et al., "Panoramic Scene Generation from Multi-View Images with Close Foreground Objects", *28th Picture Coding Symposium*, PCS2010, Nagoya, Japan, Dec. 8-10, 2010 (pp. 1-4).
Extended European Search Report dated Sep. 18, 2019 in counterpart European Patent Application No. 19166491.1 (10 pages in English).
Korean Office Action dated Feb. 7, 2020 in counterpart Korean Patent Application No. 10-2018-0116195 (4 pages in Korean).
Korean Notice of Allowance dated Oct. 27, 2020 in counterpart Korean Patent Application No. 10-2018-0116195 (2 pages in Korean).

\* cited by examiner

FIG. 1
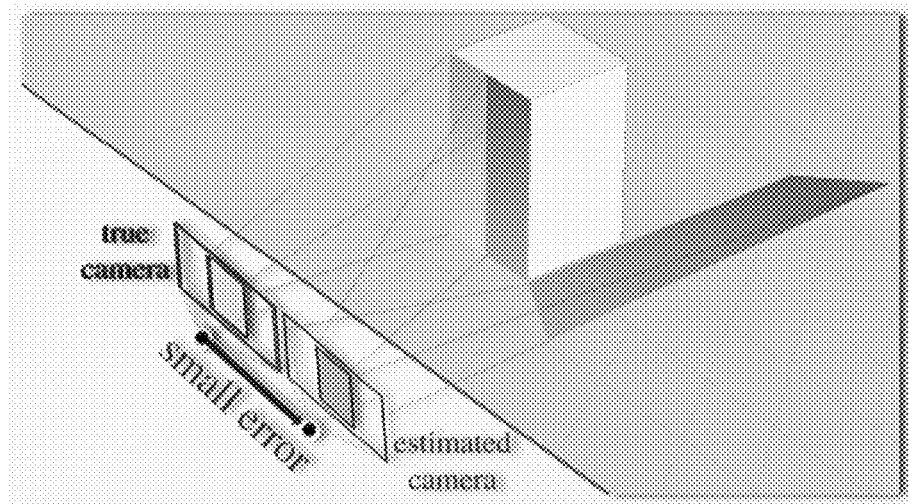
FIG. 2
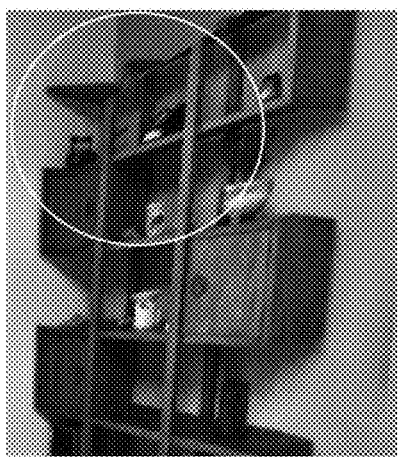 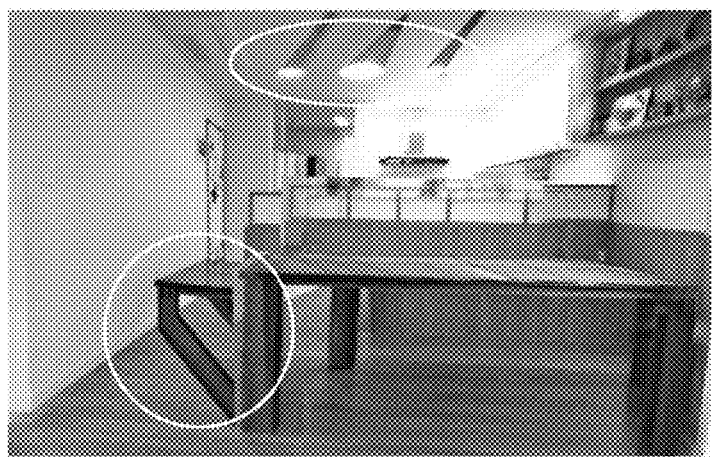

(a)            (b)            (c)

METHOD AND APPARATUS FOR GENERATING 3D MAP OF INDOOR SPACE

CROSS-REFERENCE TO RELATED APPLICATIONS

This application claims the priority of Korean Patent Application No. 10-2018-0040660 filed on Apr. 6, 2018 and Korean Patent Application No. 10-2018-0116195 filed on Sep. 28, 2018 in the Korean Intellectual Property Office, the disclosure of which is incorporated herein by reference.

BACKGROUND

Field

The present disclosure relates to a method and an apparatus for generating a 3D map of an indoor space and more particularly, to a map generating method and apparatus which three-dimensionally display an indoor space in a virtual space using information on an image and a shape of the indoor space.

Description of the Related Art

With regard to the indoor space modeling, traditionally, a method which converges a camera and a laser sensor to configure color point cloud data by mixing a geographic value obtained by a laser sensor and an image value obtained by a camera has been widely used and companies such as FARO, RieGL, or LeiCA in the construction industry commercially apply the method.

Further, a three-dimensional space may be modeled by a method which obtains color point cloud data using Kinect or a 3D sensor having a similar operating principle and estimates a movement trajectory of a sensor to accumulate the accumulated data on the moving trajectory.

However, the technology of the related art has the following problems.

First, various types of errors (a sensing error, a sensor position estimation error, and a matching error between multiple sensors) related to the sensor measurement affect a three-dimensional map of an indoor space to lower the immersion feeling of the user. For example, referring to FIG. 1, it is found that image information to be formed on a column is formed on a bottom due to a small position estimation error of an image sensor so that it is difficult to create a realistic three-dimensional map.

Second, it may be difficult to perfectly model a shape of a complex indoor structure in an arbitrary indoor environment so as to match with pixels of the image one to one. For example, referring to FIG. 2, it is understood that inconsistency between an image and a shape occurs and thus it is difficult to create a realistic three-dimensional map. Specifically, when there is a plurality of objects having very complex shapes such as chandelier, after an interior process, one-to-one matching of a shape and an image is a task that is actually impossible with current systems because it exceeds a measurement error level of the sensor itself.

Third, in order to completely emulate an arbitrary indoor environment, data on all areas of the indoor space such as under the desk or a narrow gap needs to be obtained. In order to obtain the data, a complex sensor system is necessary and data needs to be obtained by such a sensor system for a long time. Further, when the technology of the related art is performed, there is a limit in that if there is a moving person or a moving object, there is no sufficient time to measure the moving person or object by a sensor and the moving person or object moves separately from the movement of the sensor system so that geographic information therefor cannot be created. Therefore, when the existing technology is used, it is inconvenient because data needs to be obtained when there is no moving person or object or if there is a moving person or object, a user needs to wait until the moving person or object is out of a viewing angle of a sensor.

Therefore, there is a necessity for a new three-dimensional map generating method and apparatus to solve the existing problems caused when the three-dimensional map is generated.

As a prior art, there is Korean Registered Patent No. 10-1835434 (entitled "projected image generation method, device, and method for mapping image pixels and depth values, published on Jan. 18, 2017).

SUMMARY

An object to be achieved by the present disclosure is to provide a method and an apparatus for generating a three-dimensional map similar to an indoor space in a virtual space by utilizing information obtained from an indoor space.

Technical problems to be solved by the present invention are not limited to the above-mentioned technical problem(s), and other technical problem(s), which is (are) not mentioned above, can be clearly understood by those skilled in the art from the following descriptions.

According to an aspect of the present disclosure, a three-dimensional map generating method of an indoor space includes: obtaining at least one indoor space image which is an image for an indoor space; distinguishing a background area corresponding to a structure of the indoor space from a non-background area corresponding to objects located in the indoor space in at least one indoor space image; generating at least one expanded indoor space image by expanding the background area to the non-background area in at least one indoor space image; generating a depth-image associated information based on at least one expanded indoor space image and geographic information including information of a depth value for the indoor space; and generating a three-dimensional map for an indoor space using the at least one expanded indoor space image, the geographic information, and the depth-image associated information.

Desirably, before the distinguishing of the non-background area, the three-dimensional map generating method may further include: obtaining depth value information which is information of a depth value for the indoor space; and generating indoor space outline information which is outline information for the indoor space using the depth value information and the geographic information may include the depth value information and the indoor space outline information.

Desirably, after the generating of depth-image associated information, the three-dimensional map generating method may further include updating at least one of the geographic information and the depth-image associated information using at least one expanded indoor space image and features included in the geographic information, the generating of a three-dimensional map may use at least one of the updated geographic information and the depth-image associated information.

Desirably, between the generating of depth-image associated information and the generating of a three-dimensional map for the indoor space, the three-dimensional map generating method may further include re-distinguishing the background area from the non-background area in the at least one indoor space image using the geographic information and the depth-image associated information; and regenerating at least one expanded indoor space image by expanding the background area to the non-background area in the at least one indoor space image and the generating of a three-dimensional map may use the regenerated at least one expanded indoor space image.

Desirably, in the re-distinguishing of the background area from the non-background area, when the background area and the non-background area are re-distinguished for one target image among at least one indoor space image, the depth-image associated information and at least one supplementary image excluding the target image from at least one indoor space image are further used.

Desirably, the generating of a three-dimensional map for the indoor space may include: selecting one expanded indoor space image associated with a reference pose corresponding to a predetermined reference position on a three-dimensional map among the at least one expanded indoor space image, based on the depth-image associated information to determine the selected expanded indoor space image as a representative image; determining at least one supplementary image excepting the representative image among the at least one expanded indoor space image, using the depth-image associated information and the reference pose; and generating a three-dimensional map using the representative image, the at least one supplementary image, the geographic information, and the depth-image associated information.

Desirably, the three-dimensional map generating method may further include: obtaining object information including information on at least one object from an object DB including information on shapes and images of a plurality of objects; and adding at least one virtual object corresponding to the at least one object on the generated three-dimensional map, based on the object information.

Desirably, the object information may be information on an object located in the indoor space.

Desirably, the three-dimensional map generating method may further include: selectively updating the at least one virtual object added to the three-dimensional map when information on a new object is added to the object DB or information on the existing virtual object is updated.

Desirably, the three-dimensional map generating method may further include: displaying a reflected image which is an image for an indoor space which is reflected by the reflective virtual object with respect to the reference pose corresponding to a predetermined reference position on the three-dimensional map in the reflective virtual object using the at least one expanded indoor space image and the geographic information when a reflective virtual object which is a virtual object including a material which reflects light is included in the at least one virtual object.

Desirably, the three-dimensional map generating method may further include: estimating light source information including information on a position and brightness of a light source located in the indoor space from at least one indoor space image; and reflecting a lighting effect by the light source information to at least one expanded indoor space image.

According to another aspect of the present disclosure, a three-dimensional map generating apparatus of an indoor space includes: an obtaining unit which obtains at least one indoor space image which is an image for an indoor space; a distinguishing unit which distinguishes a background area corresponding to a structure of the indoor space from a non-background area corresponding to objects located in the indoor space in the at least one indoor space image; an expanding unit which expands the background area to the non-background area in the at least one indoor space image to generate at least one expanded indoor space image; an associating unit which generates a depth-image associated information based on the at least one expanded indoor space image and geographic information including information of a depth value for the indoor space; and a generating unit which generates a three-dimensional map for the indoor space using the at least one expanded indoor space image, the geographic information, and the depth-image associated information.

Desirably, the obtaining unit further obtains depth value information which is information of a depth value for the indoor space and the apparatus may further include an outline information generating unit which generates indoor space outline information which is outline information for the indoor space using the depth value information, and the geographic information includes the depth value information and the indoor space outline information.

Desirably, the associating unit may update at least one of the geographic information and the depth-image associated information using the at least one expanded indoor space image and features included in the geographic information and the generating unit may use at least one of the updated geographic information and the depth-image associated information.

Desirably, the distinguishing unit may re-distiguish the background area from the non-background area in the at least one indoor space image using the geographic information and the depth-image associated information, the expanding unit may regenerate at least one expanded indoor space image by expanding the background area to the non-background area in the at least one indoor space image, and the generating unit may use the regenerated at least one expanded indoor space image.

Desirably, when the distinguishing unit re-distinguishes the background area from the non-background area for one target image among the at least one indoor space image, the distinguishing unit may further use the depth-image associated information and at least one supplementary image excluding the target image from the at least one indoor space image.

Desirably, the generating unit may select one expanded indoor space image associated with a reference pose corresponding to a predetermined reference position on a three-dimensional map among the at least one expanded indoor space image, based on the depth-image associated information to determine the selected expanded indoor space image as a representative image, determine at least one supplementary image excepting the representative image, from the at least one expanded indoor space image, using the depth-image associated information and the reference pose, and generate a three-dimensional map using the representative image, the at least one supplementary image, the geographic information, and the depth-image associated information.

Desirably, the three-dimensional map generating apparatus may further include: a DB connecting unit which obtains object information including information on at least one object from an object DB including information on shapes and images of a plurality of objects; and the generating unit may add at least one virtual object corresponding to the at least one object on the generated three-dimensional map, based on the object information.

Desirably, the object information is information on an object located in the indoor space.

Desirably, when information on a new object is added to the object DB or information on the existing virtual object is updated, the generating unit may selectively update the at least one virtual object added to the three-dimensional map.

Desirably, when a reflective virtual object which is a virtual object including a material which reflects light is included in the at least one virtual object, the generating unit may further display a reflected image which is an image for an indoor space which is reflected by the reflective virtual object with respect to the reference pose corresponding to a predetermined reference position on the three-dimensional map in the reflective virtual object using the at least one expanded indoor space image and the geographic information.

Desirably, the three-dimensional map generating apparatus may further include: a light source estimating unit which estimates light source information including information on a position and brightness of a light source located in the indoor space from the at least one indoor space image; and a light source reflecting unit which reflects a lighting effect by the light source information to the at least one expanded indoor space image.

According to the present disclosure, even though there are various types of errors related to the sensor measurement, a 3D map even in an environment having various errors may be robustly and stably built by utilizing only a background part of the space which is relatively less affected by the error. Specifically, according to the present invention, robustness and stability are sought by positively utilizing a boundary portion of the background, and more particularly, an inner boundary line formed by a background portion with a non-background portion is enhanced to expand the background portion. Further, an edge of the image and an edge of a geography in the background are corrected to enhance mutual matchability so that a 3D map may be robustly and stably built.

Further, according to the present disclosure, a methodology which, after stably configuring a background, provides a non-background portion to be furnished on the background by utilizing information on images and shapes accumulated in a previously constructed object database (DB) is employed. By doing this, it is possible to precisely represent an object which is not only sensitive to errors but also does not have precisely constructed information from sensor information due to its characteristics utilizing the previously constructed object DB. Further, when a new object is registered or updated in the object DB with a time interval, more precise image and shape information are reflected to objects on the previously generated map through the updated object DB and all the processes may be performed by a computer algorithm without an additional effort.

Further, according to the present disclosure, even though only partial information on the background portion is obtained, the background may be configured and even though only partial information on the non-background portion is obtained, it is possible to robustly estimate a type of an object and a shape of a pose. Therefore, entire information is deduced and expressed by obtaining only partial information in a short time without obtaining all data at all times for a long time. Further, according to the present disclosure, even when there are dynamic objects such as a person which are desired not to be expressed on a final map while obtaining the data, the dynamic objects are considered as a non-background portion to be removed. Specifically, when a single geography-multiple image expressing method embodied in the present disclosure is utilized, even though it is difficult to deduce or expand the background from specific image information due to severe concealment such as a high partition, the background portion may be precisely and effectively restored utilizing image information obtained from another location.

Further, according to the present disclosure, when map data is configured by utilizing a single geography-multiple image expressing method, a lighting effect of the indoor is naturally changed in accordance with the movement of the user to express a realistic virtual map.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a view of an example in which image information of a column is projected on a floor to cause a visual error;

FIG. 2 is a view of an example in which a visual error is incurred on an outer appearance of an object on a three-dimensional map due to inconsistency of an image and a shape;

DETAILED DESCRIPTION OF THE PREFERRED EMBODIMENT

Figure 3:
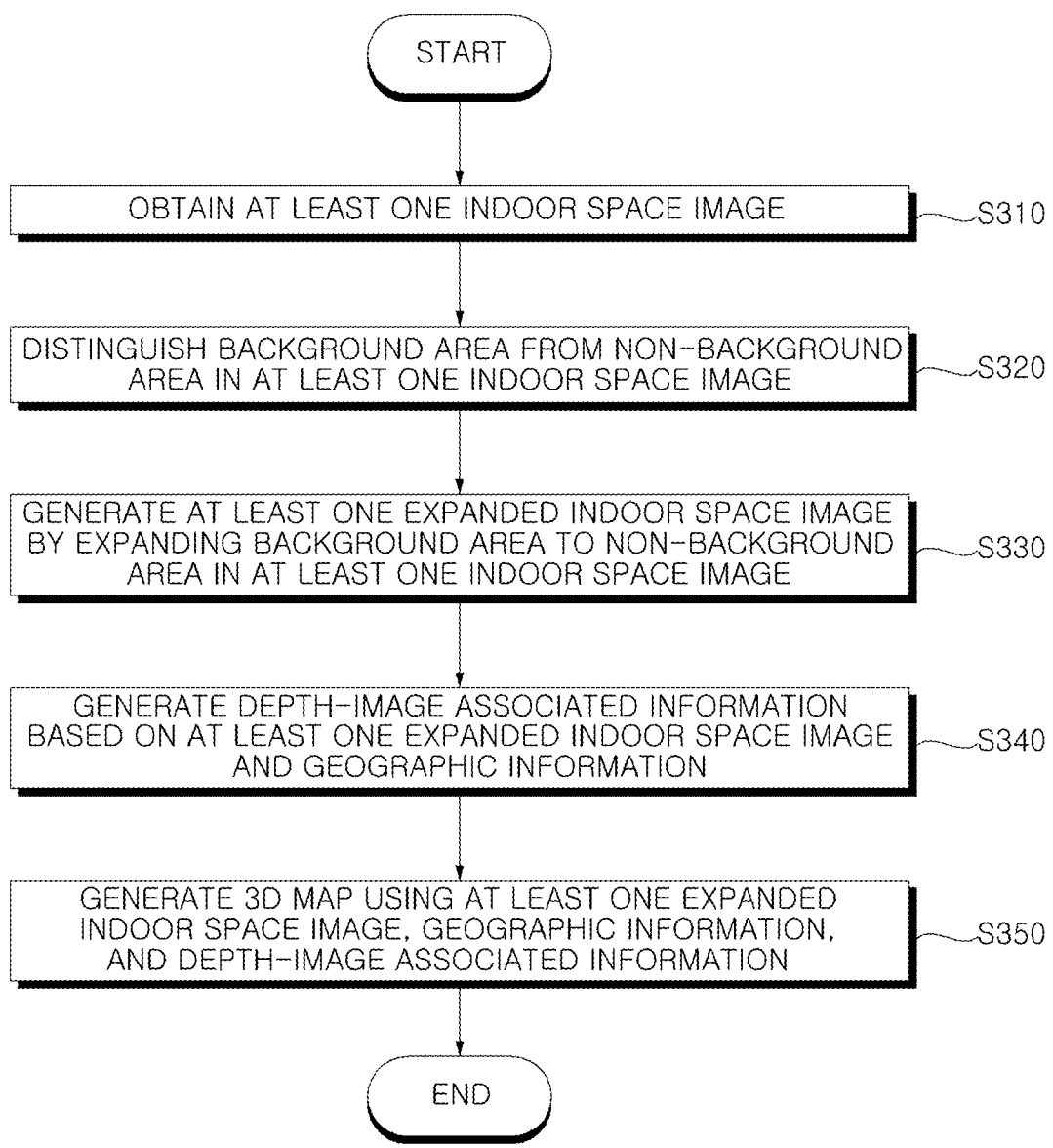
FIG. 3 is a flowchart illustrating a three-dimensional map generating method of an indoor space according to an exemplary embodiment of the present disclosure.

Those skilled in the art may make various modifications to the present invention and the present invention may have various embodiments thereof, and thus specific embodiments will be illustrated in the drawings and described in detail in the detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present invention. A singular form may include a plural form if there is no clearly opposite meaning in the context. In the present invention, it should be understood that terminology "include" or "have" indicates that a feature, a number, a step, an operation, a component, a part or the combination those of described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to accompanying drawings.

In order to implement the present disclosure, data needs to be obtained from an indoor space utilizing a sensor system including a sensor which is capable of obtaining image information. Specifically, since the indoor space is much broader and larger than a viewing angle of the sensor, the data needs to be obtained while moving the sensor so as to sufficiently store the data of the indoor space. In this case, the sensor may use a single camera or a plurality of cameras to measure a depth and an inertial sensor or a laser sensor which is capable of measuring a distance may be combined to be used.

Figure 11C:
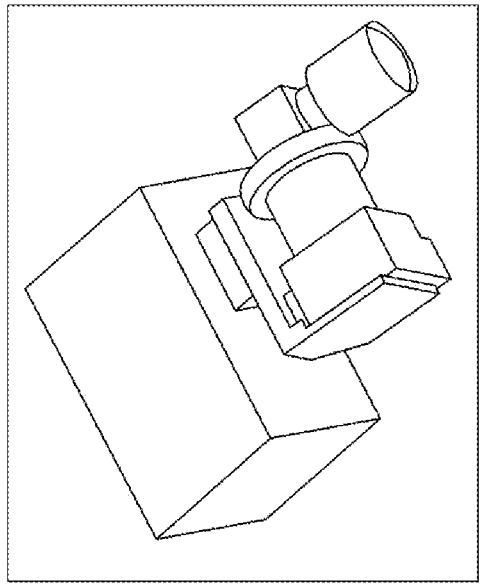
FIGS. 11A to 11C are a view of a wheel-type mobile robot, a backpack type system, and a hand-type system equipped with a camera, an inertial sensor, and a distance measuring sensor, respectively, as an example of a sensor system for data acquisition.
Figure 11B:
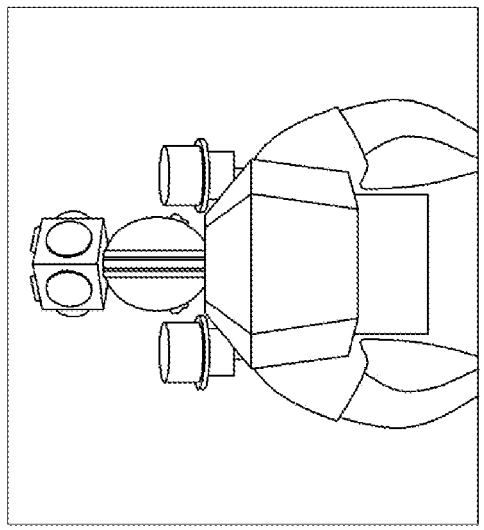
Figure 11A:
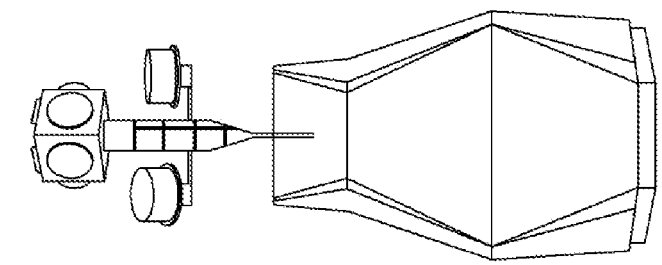

In this case, since a sensor value is obtained while movement in an indoor space, a three-dimensional pose from which individual sensor data is obtained may be different from each other. Therefore, a pose value from which individual sensor data is obtained needs to be precisely estimated to create a precise three-dimensional map and thus a three-dimensional pose may be estimated by utilizing a technique such as simultaneous localization and mapping (SLAM). However, when the sensor system utilizes a mobile robot as illustrated in FIGS. 11A to 11C, data is obtained at a fixed height, so that the present disclosure may be implemented only by estimating a state vector of a two-dimensional pose. That is, data with consistency of a sensor obtaining pose may be obtained.

In the meantime, a configuration of the sensor value may vary depending on a type of a sensor. For example, when the sensor is configured only by a signal camera, the sensor value is configured only by a camera image and the image is utilized to extract a feature in the image. A relative distance between the features is estimated using the single camera and an absolute distance between the features is estimated using the plurality of cameras. Specifically, in the case of the single camera, a depth of the pixel may be estimated by utilizing the accumulated image information without extracting a feature and in the case of the plurality of cameras, the depth of pixel may be estimated by images of the plurality of cameras or accumulated information thereof.

Further, when information of an additional inertial sensor or a depth measurement sensor is utilized together, the sensor information may be processed in accordance with a unique characteristic of each sensor. For example, as illustrated in FIG. 11A to 11C, when inertial sensor information can be obtained, the information is utilized to improve the performance of the SLAM or the information is used as prediction information for an image obtaining point at the time of processing the image information to facilitate the correction for the image obtaining point. Further, an acceleration value or an angular velocity of the inertial information is utilized to estimate an actual movement distance and correct a scale of a depth value extracted from a single camera or a plurality of cameras.

Figure 12:
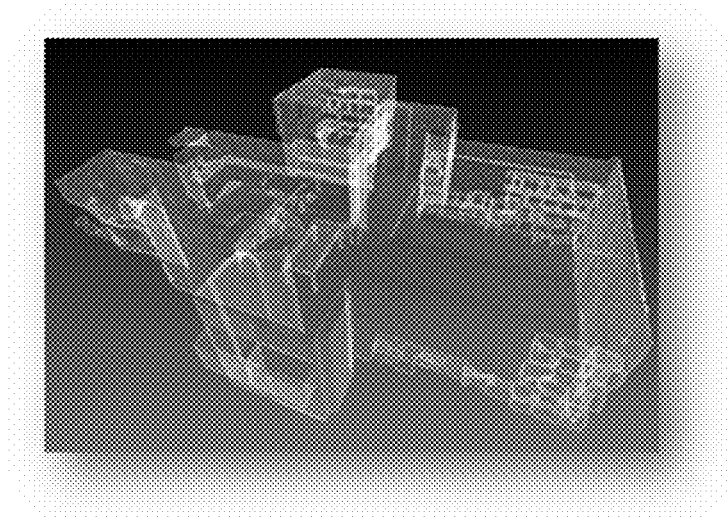
FIG. 12 is a view of a three-dimensional geographic information generated using a Lidar sensor.

In the same context, when it is possible to obtain sensor information which enables depth measurement in the unit of ray, such as LiDAR or Kinect, an obtained pose of the data is estimated through SLAM and depth measurement data is enumerated based on the estimated pose to more precisely estimate a three-dimensional geographic information as illustrated in FIG. 12.

Figure 21:
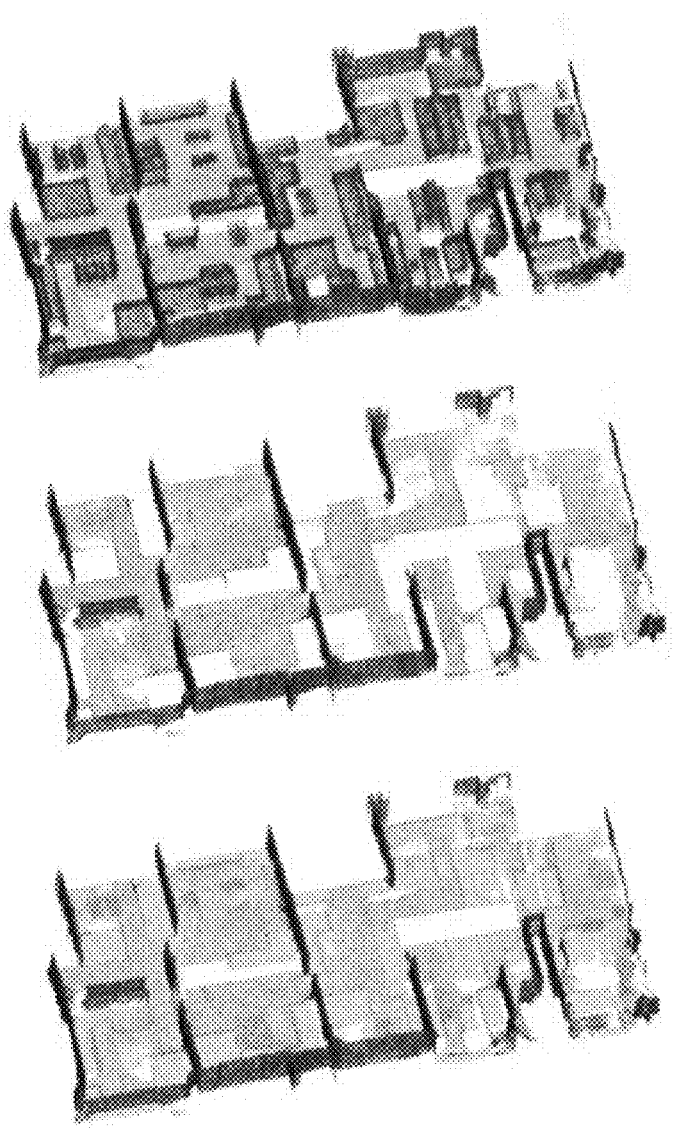
FIG. 21 is a view illustrating various exemplary embodiments of geographic information formed by point cloud data.

In this case, as illustrated in FIG. 21, the geographic information may include a point cloud type (top) formed by collecting points measured at every ray, a point cloud type (middle) formed by collecting points corresponding to a background excluding objects from point clouds, or a point cloud type (bottom) in which a background portion blocked by objects is restored based on a geographic continuity of the background portion.

Figure 22:
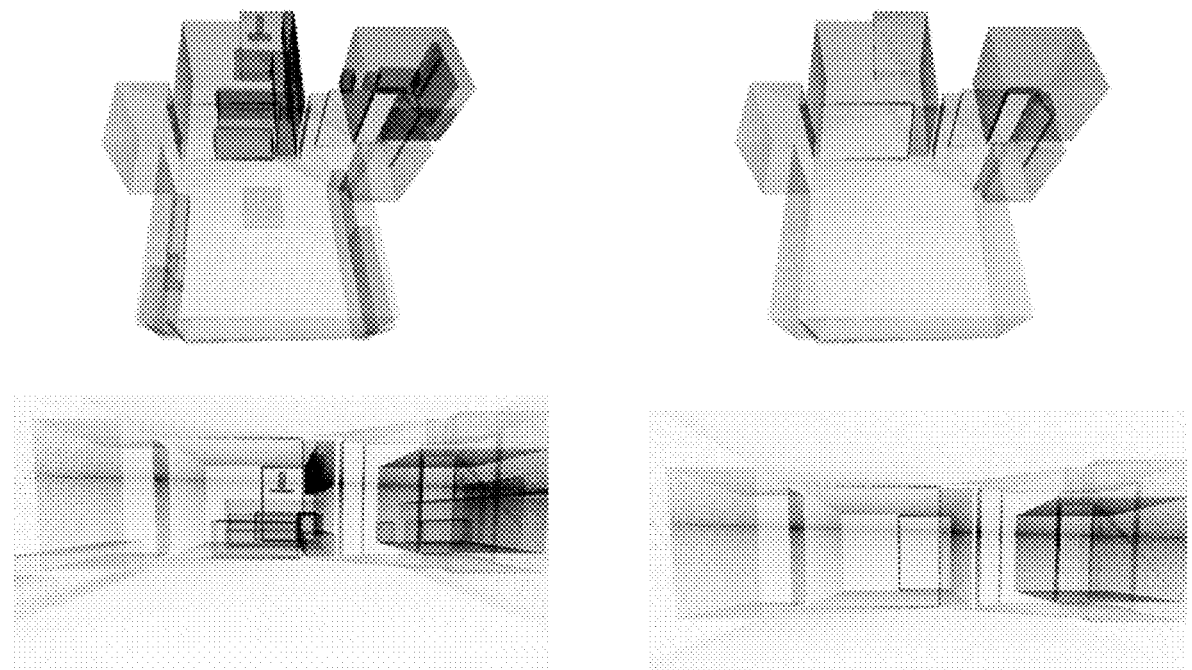
FIG. 22 is a view illustrating various exemplary embodiments of geographic information configured in the form of mesh.

Further, as illustrated in FIG. 22, the geographic information expands to be represented in the form of mesh (upper left: outdoor view point, lower left: indoor view point) or meshes corresponding to a background from which objects are excluded in the mesh are collected (upper right: outdoor view point, lower right: indoor view point).

Figure 13:
FIG. 13 is a view in which 360-degree panoramic image and a depth value are associated with each other in the form of mesh.

In this case, a method of representing raw data of the three-dimensional map may vary depending on a configuration and an implementing method of the sensor. Among them, when a 360-degree camera is used, as illustrated in FIG. 13, the obtained image is represented as a panoramic image and an estimated depth value is associated with the panoramic image in the form of mesh, a coordinate value compared with the obtained image or a specific referential point of the mesh is stored as a 3D or 2D pose form. FIG. 13 is an example of data of a specific pose and raw data of the three-dimensional map may be configured by a plurality of data depending on an area of the indoor space.

In the meantime, referring to FIGS. 11A to 11C, a three-dimensional map generating apparatus of an indoor space according to an exemplary embodiment of the present disclosure receives data required to generate a three-dimensional map from a wheel type mobile robot to which a sensor system including a camera, an inertial sensor, and a Lidar sensor is attached through wired or wireless communication. Alternatively, the three-dimensional map generating apparatus of an indoor space according to an exemplary embodiment of the present disclosure is directly mounted in the wheel type mobile robot attached with a sensor system to generate a three-dimensional map. Alternatively, the three-dimensional map generating apparatus of an indoor space according to an exemplary embodiment of the present disclosure may be a backpack type system, a small scanner, or a smart phone including a camera and an inertial sensor or may be mounted in a system including a smart phone expanding device to generate a three-dimensional map.

However, the three-dimensional map generating apparatus of an indoor space according to an exemplary embodiment of the present disclosure is not limited to use the systems illustrated in FIGS. 11A to 11C, but may receive data required to generate a three-dimensional map from a device including various sensor systems or may be mounted in various types of devices to generate a three-dimensional map.

FIG. 3 is a flowchart illustrating a three-dimensional map generating method of an indoor space according to an exemplary embodiment of the present disclosure.

In step S310, a three-dimensional map generating apparatus obtains at least one indoor space image which is an image for an indoor space.

For example, the three-dimensional map generating apparatus may obtain at least one indoor space image which is an image for an indoor space, from an external device attached with a camera or a camera which is attached to the three-dimensional map generating apparatus.

In this case, the indoor space image may be an image obtained by photographing the indoor space in various locations in the indoor space.

In step S320, the three-dimensional map generating apparatus distinguishes a background area corresponding to a structure of the indoor space from a non-background area corresponding to objects located in the indoor space in at least one indoor space image.

In this case, the background area may refer to a portion corresponding to only the structure of the indoor space in the indoor space image. Further, the non-background area may refer to a portion which is desired not to be represented in a final map, such as objects located in the indoor space or a moving person in the indoor space image.

Figure 14:
FIGS. 14 and 15 are views illustrating an indoor space where no object is located and an indoor space where various types of objects are located.
Figure 15:
Figure 16:
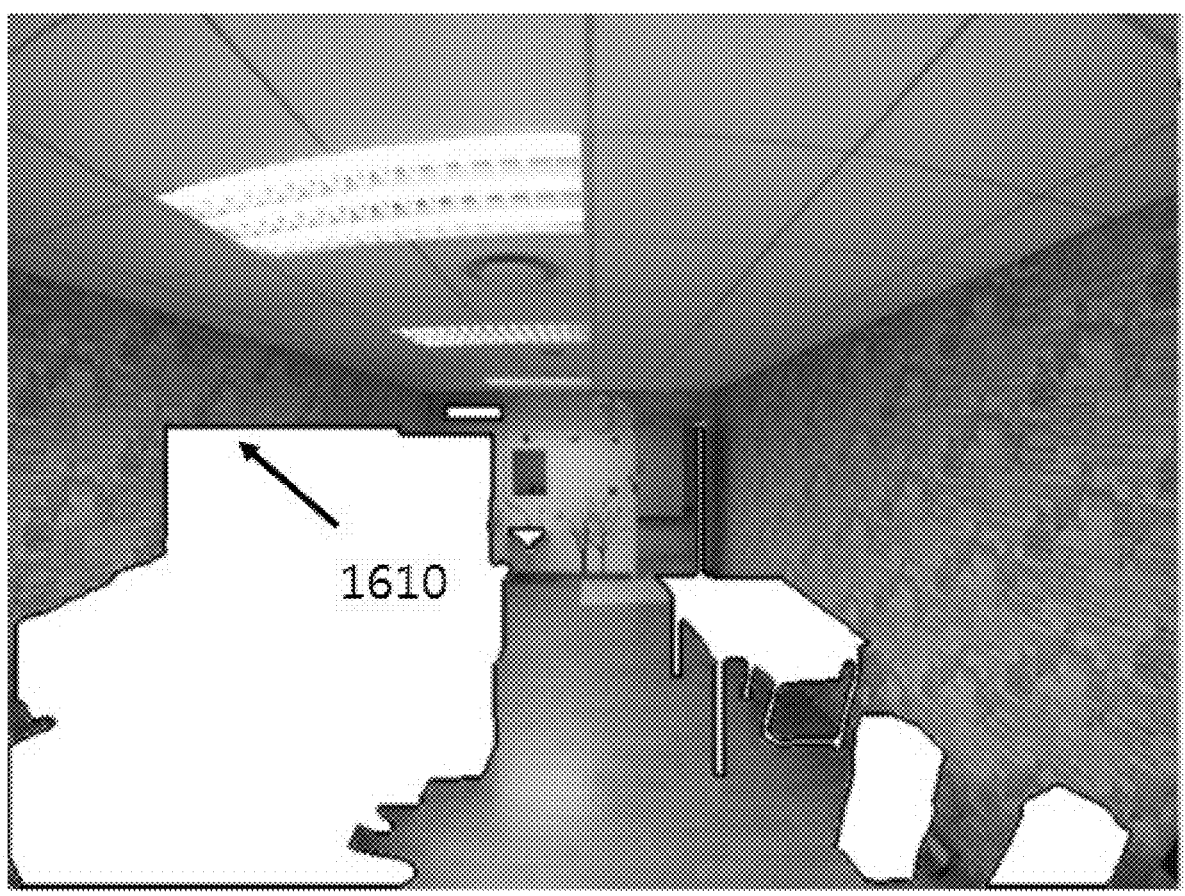
FIGS. 16 and 17 are views illustrating a background area and a non-background area of an indoor space, respectively.
Figure 17:
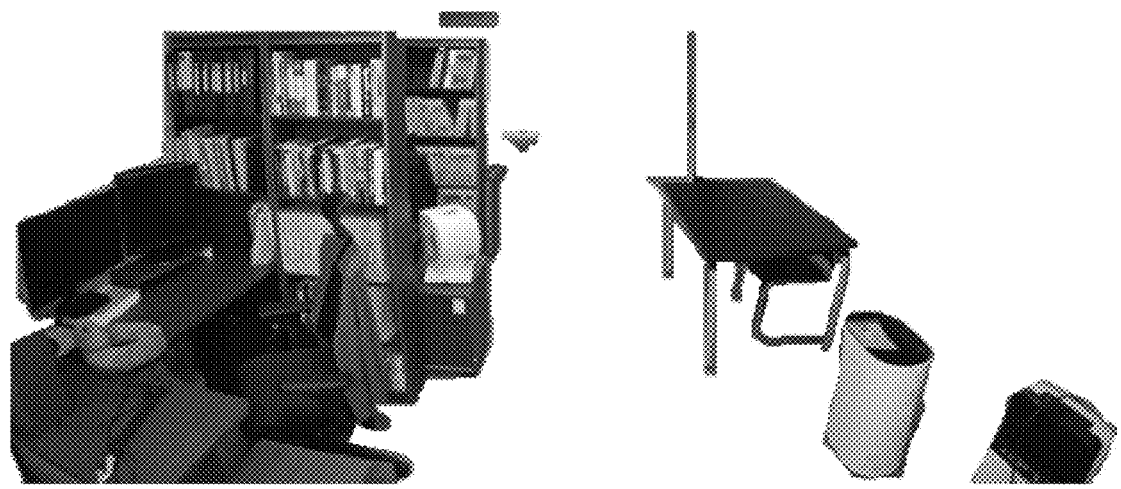

For example, referring to FIGS. 14 to 17, FIG. 15 illustrates the indoor space image in which various objects (desks, book shelves, or chairs) are located in the indoor space. In this case, as illustrated in FIG. 16, a portion from which objects are removed (displayed with a white color) is a background and as illustrated in FIG. 17, portions corresponding to the objects may be a non-background. In this case, referring to FIG. 14, the background may refer to a structure of a building itself which forms the indoor space or may include a structure (for example, a door or a window) attached to the building in addition to the structure of the building itself.

In the meantime, the three-dimensional map generating apparatus may distinguish elements which may be discontinuous due to concealment by another element among components existing at least one indoor space image but actually continuously configured in the configuration of the actual environment as the background area. Further, the three-dimensional map generating apparatus may distinguish an area excluding an area distinguished as a background area, as a non-background area in at least one indoor space image. In this case, the three-dimensional map generating apparatus may distinguish the background area from the non-background area based on a pixel value of an image which forms at least one indoor space image.

In this case, the background area may be a portion which is configured first in time in an environment where a person lives, as illustrated in FIG. 14. That is, the background is a combination of components existing at the time of completing a wallpapering or painting task and then as illustrated in FIG. 15, non-background elements (for example, various objects) may be put on the background area. Further, the background area may be a portion which is partially blocked by other elements so that the data is not complete but is deduced to have a similarity to a portion which is not blocked to be reconstructed from the portion which is not blocked using hole filling or inpainting technique. Further, the background area may be a portion which may block other objects such as a large signboard or an information desk in the building but may have the matchability of the image and the geography coinciding with each other at the edge portion of the object in all the data or cause the matchability of the image and the geography to coincide with each other through a separate matching process.

In step S330, the three-dimensional map generating apparatus generates at least one expanded indoor space image by expanding the background area to the non-background area in at least one indoor space image.

In this case, the three-dimensional map generating apparatus expands the background area to the non-background area using information on a background area of at least one indoor space image to generate an expanded indoor space image.

For example, referring to FIG. 16, the three-dimensional map generating apparatus may expand the background area to the non-background area using information on the background area in the indoor space image. That is, the three-dimensional map generating apparatus may deduce and reinforce a portion corresponding to the non-background area using information on an edge included in the background area to generate an expanded indoor space image.

More specifically, when the edge included in the background area is disconnected at a boundary line 1610 with the non-background area, the three-dimensional map generating apparatus may generate an expanded indoor space image through deduction that an extension line of the edge is continued to the non-background area beyond the boundary line 1610 between the background area and the non-background area.

In this case, the three-dimensional map generating apparatus specifies one or more indoor space images other than a specific indoor space image as a background supplement image and an area corresponding to the non-background area of the specific indoor space image may be reduced using information on the background supplement image.

Figure 18:
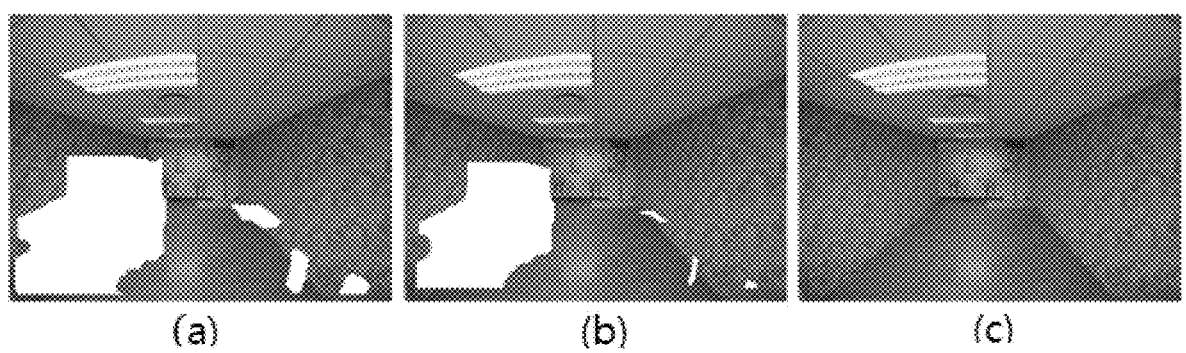
FIG. 18 is a view illustrating a result obtained by expanding a background area according to an exemplary embodiment of the present disclosure to a non-background area.
Figure 19:
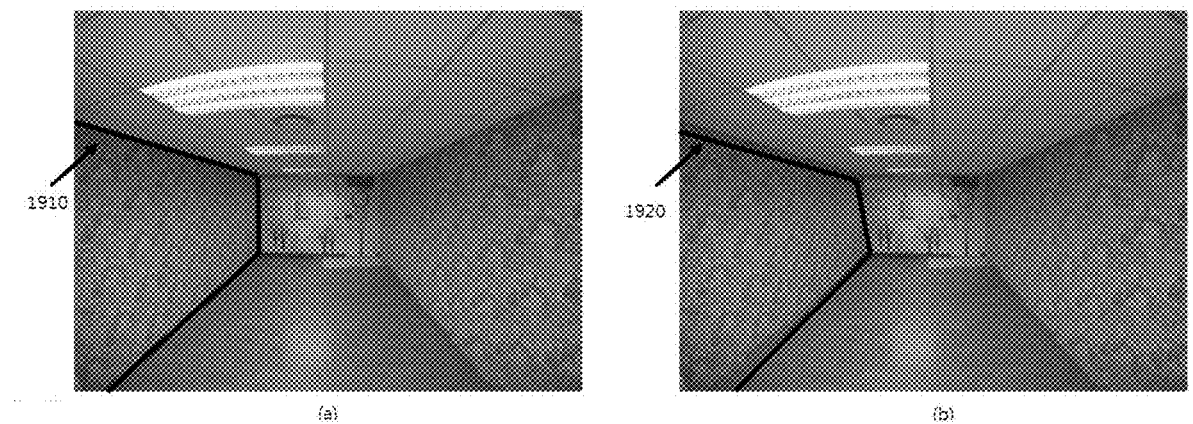
FIG. 19 is a view illustrating edges included in an expanded indoor space image and indoor structure outline information according to an exemplary embodiment of the present disclosure.

In the meantime, referring to FIG. 19, the three-dimensional map generating apparatus may partially perform the expansion as needed. In this case, 10% of expansion is performed in FIG. 18A, 30% of expansion is performed in FIG. 18B, and the entire expansion is performed in FIG. 18C. If a user wants to model only the structure of the indoor space in which no object is provided and furnish arbitrary virtual objects in the virtual indoor space, 100% of expansion as illustrated in FIG. 18C is also possible.

In step S340, the three-dimensional map generating apparatus generates a depth-image associated information based on at least one expanded indoor space image and geographic information including information of a depth value for the indoor space.

In this case, the depth-image associated information may be information that matches a depth value of the indoor space corresponding to pixels of at least one expanded indoor space image.

To this end, the three-dimensional map generating apparatus may generate depth-image associated information further using an image obtaining pose and a depth obtaining pose including information on obtaining locations and obtaining angles of at least one expanded indoor space image and the geographic information in addition to at least one expanded indoor space image and the geographic information.

More specifically, the three-dimensional map generating apparatus may find a coordinate relationship in which all or some of pixels of an individual image correspond to the depth value included in the geographic information through the image obtaining pose associated with at least one expanded indoor space image. Further, this is repeatedly applied to the at least one expanded indoor space image to generate depth-image associated information.

In the meantime, when a resolution of the image sensor is higher than a resolution of the distance sensor, an unmapped pixel which does not have a corresponding depth value may be generated in the pixels of at least one expanded indoor space image. In this case, the three-dimensional map generating apparatus may map an estimated depth value to an unmapped pixel using interpolation.

According to another exemplary embodiment, the three-dimensional map generating apparatus may update at least one of the geographic information and the depth-image associated information using features included in at least one expanded indoor space image and the geographic information.

For example, referring to FIG. 13, when all or some of the pixels of the individual image are interlinked to a specific reference coordinate and the depth-image associated information obtained by the interlinked relationship of the reference coordinate and the geographic information is given to map the geographic information to the image pixel, the three-dimensional map generating apparatus may perform a feature based matching process of updating at least one of the reference coordinate and the geographic information to match the feature included in the expanded indoor space image and the geographic information in accordance with a predetermined criterion.

In this case, the features in the feature based matching process are present in each of the expanded indoor space image and the geographic information and interlinked to each other and more specifically, may be configured by edge information, point information, segment information, line information, planar piece information, plane information, or a combination thereof.

For example, referring to FIG. 19, when the edge 1910 of at least one expanded indoor space image and an edge 1920 of the geographic information do not match each other, the reference coordinate may be modified to increase the matchability between the edge 1910 of the expanded indoor space image and the edge 1920 of the geographic information.

In another exemplary embodiment, the three-dimensional map generating apparatus may increase the matchability between the edge 1910 of the expanded indoor space image and the edge 1920 of the geographic information by correcting the geographic information during the feature based matching process.

That is, when at least one of the reference coordinate and the geographic information is updated through the feature based matching process as described above, the three-dimensional map generating apparatus may update the depth-image associated information as illustrated in FIG. 13, based on the updated information. Further, the three-dimensional map generating apparatus may use at least one of the updated depth-image associated information and the geographic information to generate a three-dimensional map.

In still another exemplary embodiment, the three-dimensional map generating apparatus re-distinguishes the background area from the non-background area using the geographic information and the depth-image associated information to regenerate at least one expanded indoor space image.

Figure 20:
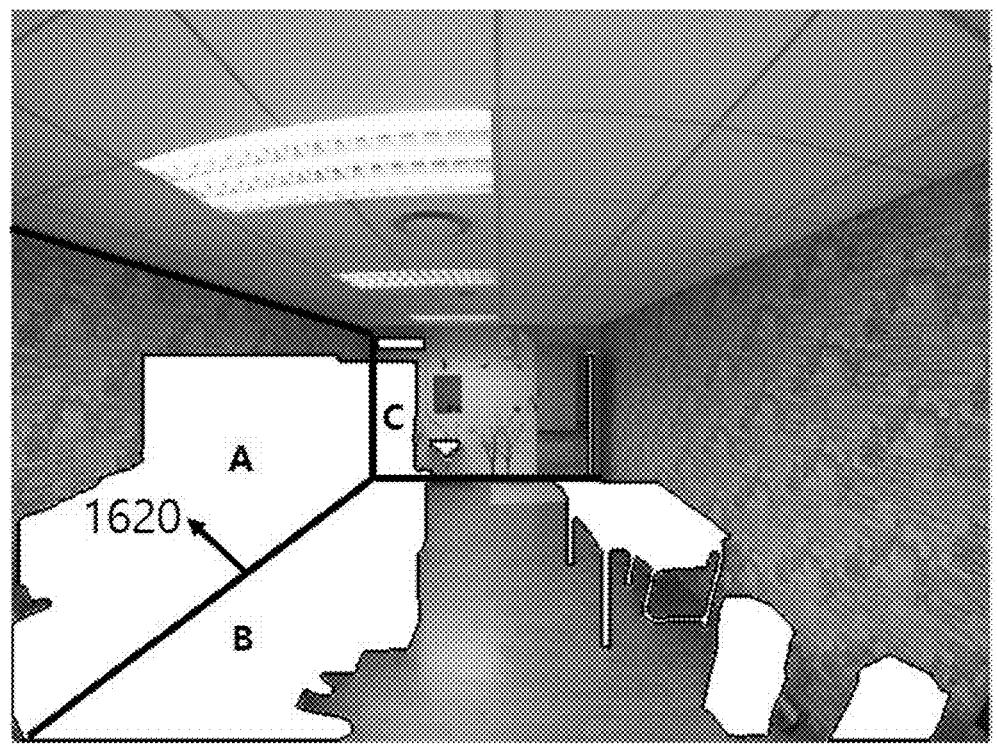
FIG. 20 is a view illustrating an example in which areas on an image are partitioned to have the same area in geographic information.

That is, the three-dimensional map generating apparatus may more precisely re-distinguish the background area from the non-background area using the depth-image associated information. More specifically, as illustrated in FIG. 20, the three-dimensional map generating apparatus maps a boundary line 1620 (that is, a feature) corresponding to the same plane in the geographic information to an image through the depth-image associated information and divides the inside of the boundary line 1610 into A, B, and C utilizing the mapping information, and expands an image of the background area to the non-background area utilizing the divided information.

In this case, the features in the geographic information are present in each of the image and the geographic information and interlinked to each other and more specifically, may be configured by edge information, point information, segment information, line information, planar piece information, plane information, or a combination thereof.

Further, the three-dimensional map generating apparatus expands the background area which is re-distinguished in the indoor space image to a non-background area to regenerate at least one expanded indoor space image. Further, the three-dimensional map generating apparatus may use the regenerated at least one expanded indoor space image to generate a three-dimensional map.

In still another exemplary embodiment, when the three-dimensional map generating apparatus re-distinguishes the background area from the non-background area for one target image of at least one indoor space image, the three-dimensional map generating apparatus may further use the depth-image associated information and at least one supplementary image excluding the target image from at least one indoor space image.

That is, the three-dimensional map generating apparatus may specify parts far from the reference coordinate among pixels in a specific target image using the depth-image associated information and expand the background area to the non-background area by simultaneously utilizing at least one supplementary image and the depth-image associated information other than the specific image for the corresponding parts. Further, for an image which is not easy to estimate a background due to concealment in the target image, at least one supplementary image having more excellent image information therefor is specified through the depth-image associated information and the background area may be expanded to the non-background area by utilizing the supplementary image.

Finally, in step S350, the three-dimensional map generating apparatus generates a three-dimensional map for an indoor space using the at least one expanded indoor space image, the geographic information, and the depth-image associated information.

In this case, the three-dimensional map generating apparatus may generate a more realistic three-dimensional map by mapping at least one expanded indoor space image to the geographic information based on the depth-image associated information. The generated three-dimensional map may interlink with a user viewer which operates in a smart phone, a PC, and a tablet and the user may see the three-dimensional map for the indoor space through the user viewer.

Further, the three-dimensional map generating apparatus performs the feature based matching process as described above to improve realism experienced by the user.

In the meantime, when a field of view to be represented by a user viewer in the indoor space exceeds a field of view which is capable of being represented by a single expanded indoor space image, the three-dimensional map generating apparatus may represent the field of view of the user by utilizing the depth-image associated information and one or more expanded indoor space image.

Figure 23:
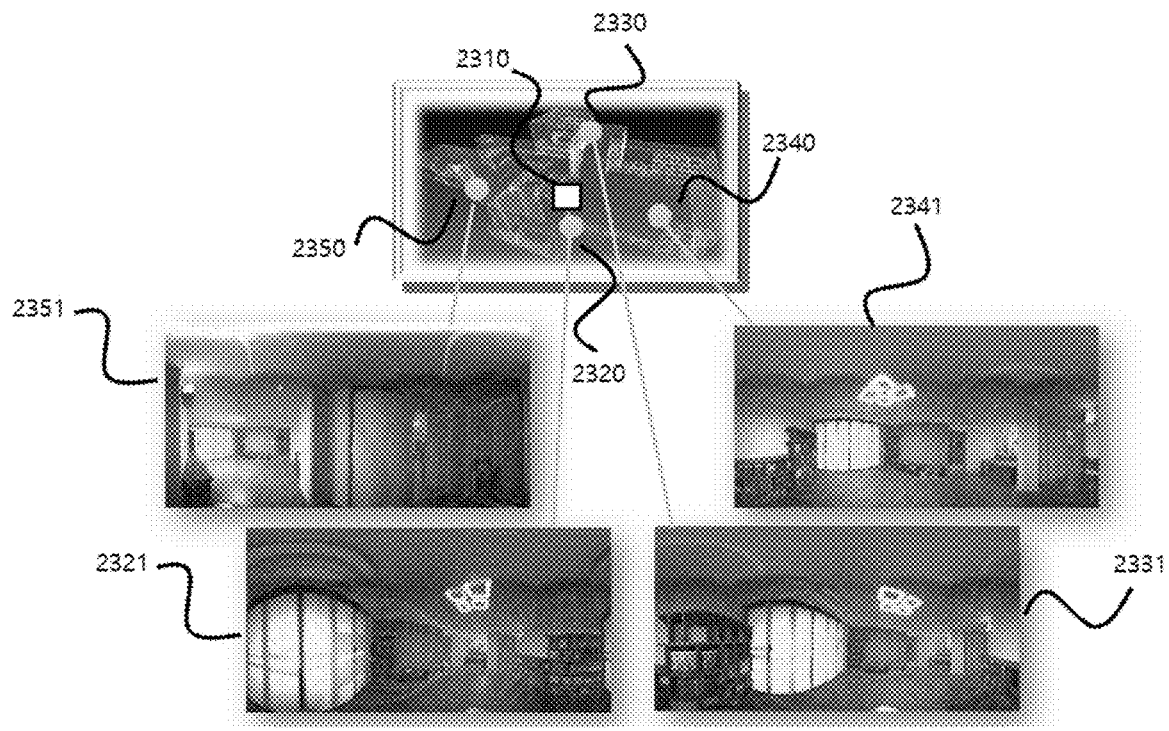
FIG. 23 is a view of an exemplary embodiment in which an indoor space is represented by a depth-image associated form with respect to a specific pose and an expanded indoor space image is utilized to represent an arbitrary field of view in a user viewer.

More specifically, as illustrated in FIG. 23, a reference position 2310 of a field of view to be represented by the user viewer is different from reference positions 2320, 2330, 2340, and 2350 of expanded indoor space images 2321, 2331, 2341, and 2351 having depth-image associated information, the field of view of the user viewer cannot be represented by the single expanded indoor space image and lost field of view may be generated.

In this case, a plurality of expanded indoor space images required to represent all fields of view of the reference position 2310 of the field of view of the user is specified by the depth-image associated information and an expanded indoor space image associated with a pose in proximity to a reference pose of the user viewer is designated as a representative image and at least one expanded indoor space image other than the representative image is designated as a supplementary image to represent all the fields of view of the user viewer simultaneously utilizing the representative image and at least one supplementary image.

In the meantime, a detailed method of generating a three-dimensional map using a representative image and at least one supplementary image by the three-dimensional map generating apparatus will be described in detail with reference to FIG. 5.

In another exemplary embodiment, the three-dimensional map generating apparatus may generate geographic information using at least one indoor space image.

For example, the three-dimensional map generating apparatus may extract a feature in an image using at least one indoor space image and may estimate a relative distance between the features in the case of a single camera and may estimate an absolute distance between the features in the case of a plurality of cameras. Further, in the case of the single camera, the three-dimensional map generating apparatus may estimate a depth of the pixel utilizing the accumulated image information without extracting a feature and in the case of the plurality of cameras, may estimate the depth of pixel by images of the plurality of cameras or accumulated information thereof.

By doing this, the three-dimensional map generating apparatus may generate geographic information using at least one indoor space image.

As described above, the three-dimensional map generating method of an indoor space according to an exemplary embodiment of the present disclosure utilizes only a background part of the space which is relatively less affected by the error to robustly and stably build a 3D map even in an environment having various errors.

Figure 4:
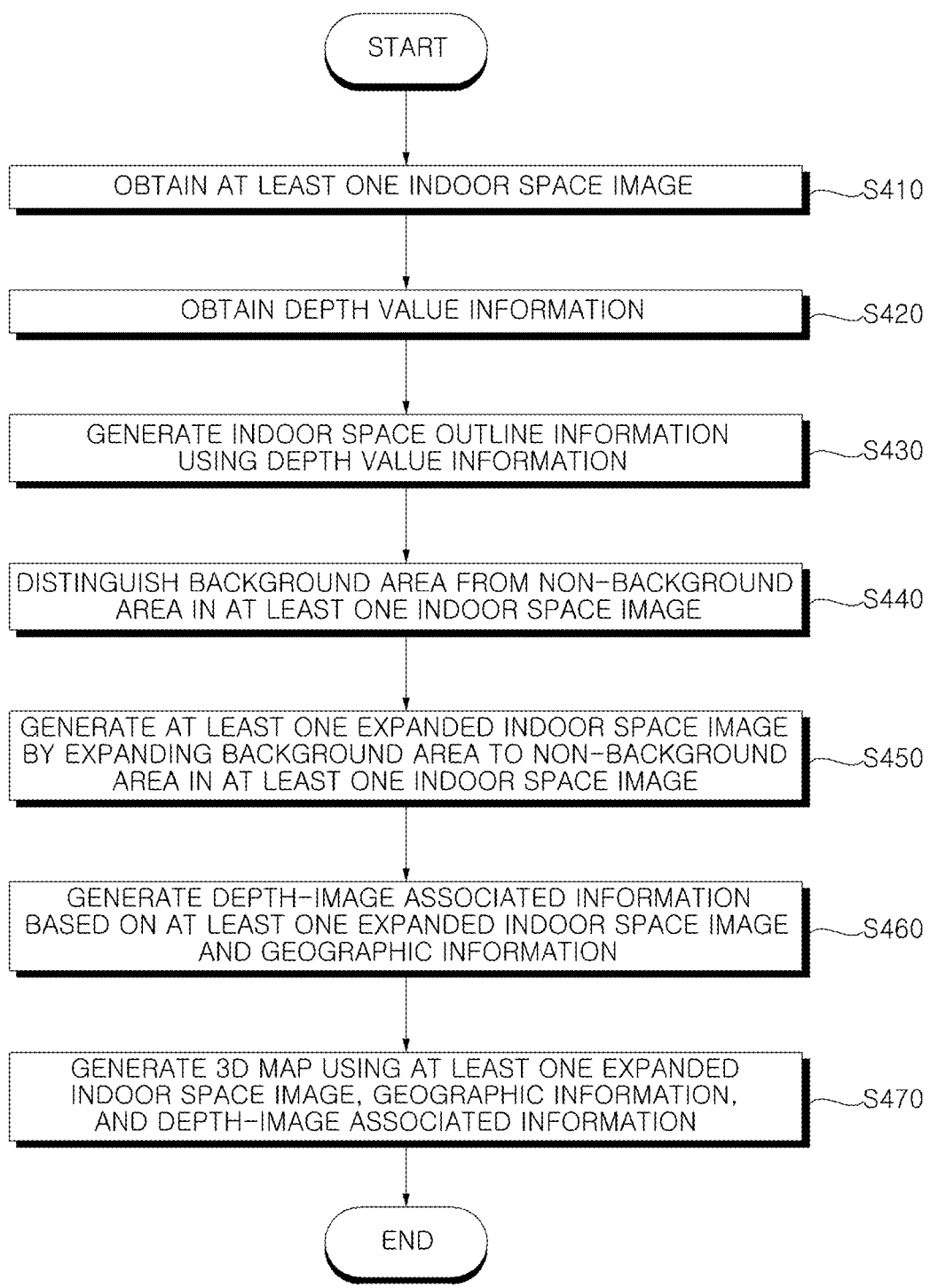
FIG. 4 is a flowchart illustrating a three-dimensional map generating method of an indoor space according to another exemplary embodiment of the present disclosure.

FIG. 4 is a flowchart illustrating a three-dimensional map generating method of an indoor space according to another exemplary embodiment of the present disclosure.

In step S410, a three-dimensional map generating apparatus obtains at least one indoor space image which is an image for an indoor space.

In step S420, the three-dimensional map generating apparatus obtains depth value information which is information on a depth value for an indoor space.

For example, the three-dimensional map generating apparatus may obtain the depth value information for an indoor space, from an external device mounted with a depth measurement sensor or a depth measurement sensor attached to the three-dimensional map generating apparatus.

In step S430, the three-dimensional map generating apparatus generates indoor space outline information which is outline information for the indoor space using the depth value information.

Here, the indoor space outline information may be outline information on a structure of the indoor space where there is no object.

In the meantime, the three-dimensional map generating apparatus may generate indoor space outline information of a state in which objects in the indoor space are removed, using an algorithm such as a convex cut. Here, the convex cut algorithm is an algorithm which extracts a structure of the indoor space in real time using depth value information (point cloud data) of the indoor space.

In step S440, the three-dimensional map generating apparatus distinguishes a background area corresponding to a structure of the indoor space from a non-background area corresponding to objects located in the indoor space in at least one indoor space image.

In step S450, the three-dimensional map generating apparatus generates at least one expanded indoor space image by expanding the background area to the non-background area in at least one indoor space image.

In step S460, the three-dimensional map generating apparatus generates depth-image associated information based on at least one expanded indoor space image and geographic information including information of a depth value for the indoor space.

Finally, in step S470, the three-dimensional map generating apparatus generates a three-dimensional map for an indoor space using the at least one expanded indoor space image, the geographic information, and the depth-image associated information.

Here, the geographic information may include the depth value information and the indoor space outline information.

Figure 5:
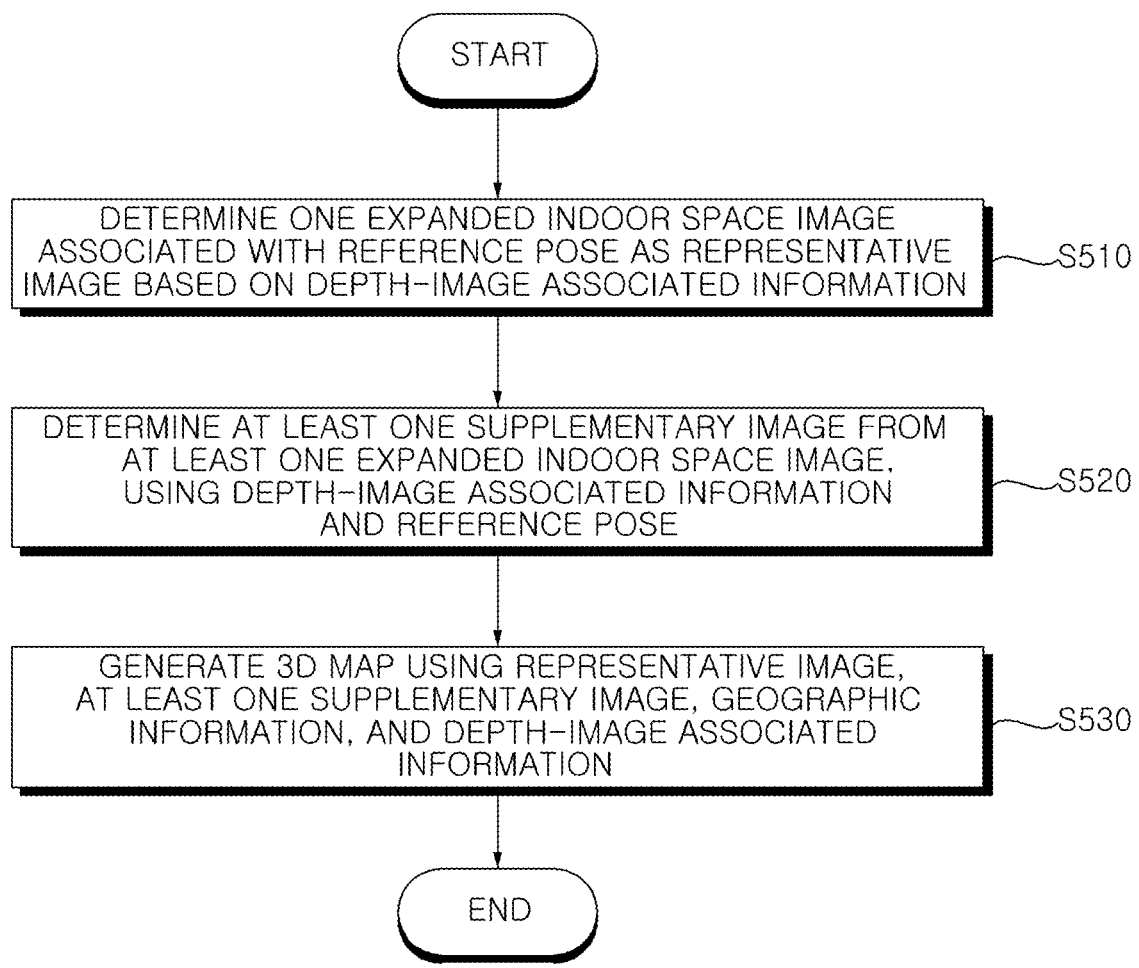
FIG. 5 is a flowchart illustrating a three-dimensional map generating method of an indoor space using a representative image and a supplementary image according to an exemplary embodiment of the present disclosure.

FIG. 5 is a flowchart illustrating a three-dimensional map generating method of an indoor space using a representative image and a supplementary image according to an exemplary embodiment of the present disclosure.

In step S510, the three-dimensional map generating apparatus selects one expanded indoor space image associated with a reference pose corresponding to a predetermined reference position on a three-dimensional map among at least one expanded indoor space image, based on the depth-image associated information and determines the selected expanded indoor space image as a representative image.

For example, the three-dimensional map generating apparatus determines a pose of a user viewer among at least one expanded indoor space image as a reference pose and selects one expanded indoor space image associated with a pose closest to the reference pose to be determined as a representative image.

In step S520, the three-dimensional map generating apparatus determines at least one supplementary image excepting the representative image, from at least one expanded indoor space image, using the depth-image associated information and the reference pose.

For example, the three-dimensional map generating apparatus may additionally determine at least one supplementary image close to the reference pose.

Finally, in step S530, the three-dimensional map generating apparatus generates a three-dimensional map using the representative image, the at least one supplementary image, the geographic information, and the depth-image associated information.

That is, the three-dimensional map generating apparatus may represent all fields of view corresponding to the user viewer by simultaneously utilizing the representative image and the at least one supplementary image.

Figure 6:
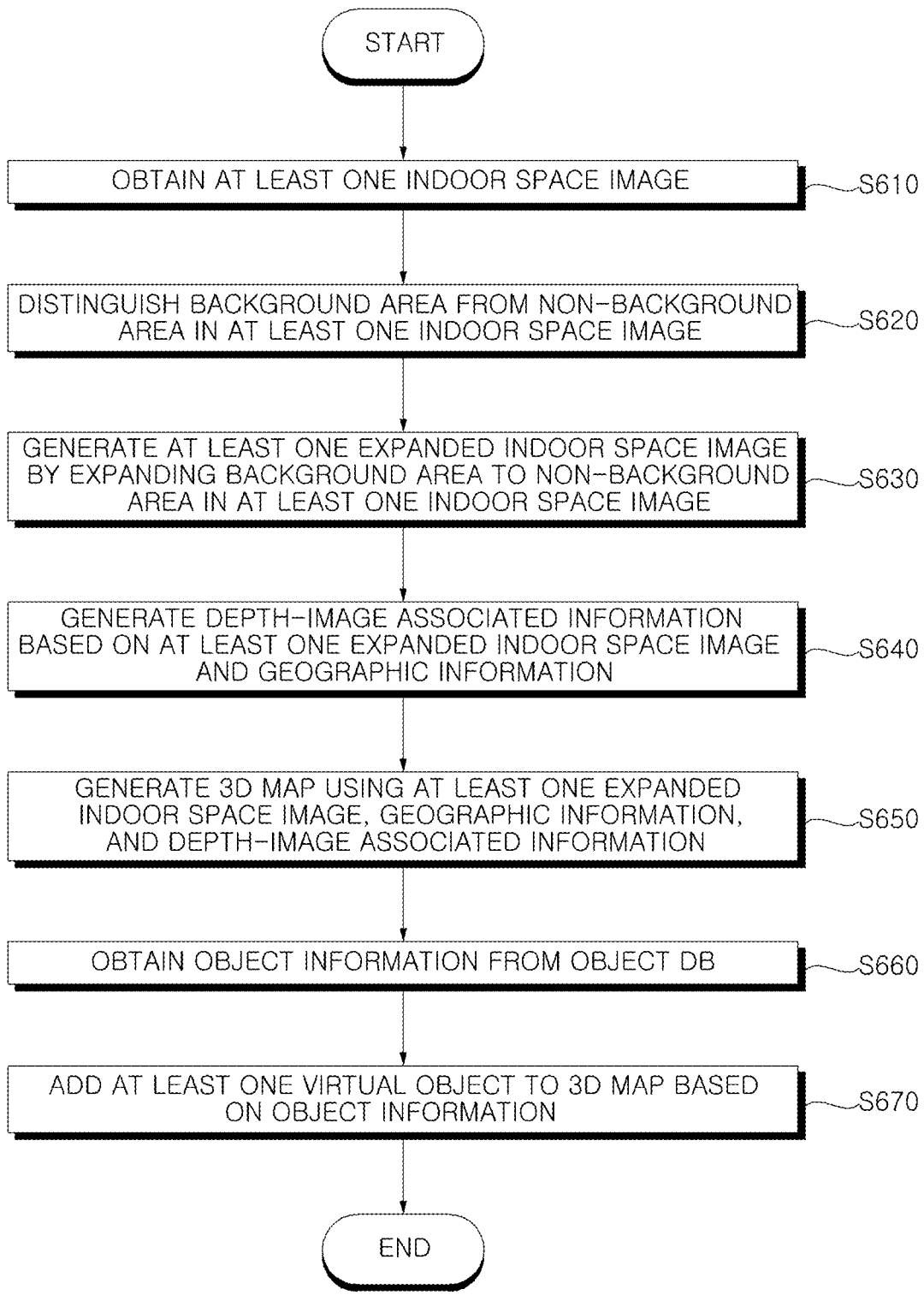
FIG. 6 is a flowchart illustrating a three-dimensional map generating method of an indoor space according to still another exemplary embodiment of the present disclosure.

FIG. 6 is a flowchart illustrating a three-dimensional map generating method of an indoor space according to still another exemplary embodiment of the present disclosure.

In step S610, a three-dimensional map generating apparatus obtains at least one indoor space image which is an image for an indoor space.

In step S620, the three-dimensional map generating apparatus distinguishes a background area corresponding to a structure of the indoor space from a non-background area corresponding to objects located in the indoor space in at least one indoor space image.

In step S630, the three-dimensional map generating apparatus generates at least one expanded indoor space image by expanding the background area to the non-background area in at least one indoor space image.

In step S640, the three-dimensional map generating apparatus generates depth-image associated information based on at least one expanded indoor space image and geographic information including information of a depth value for the indoor space.

In step S650, the three-dimensional map generating apparatus generates a three-dimensional map for an indoor space using the at least one expanded indoor space image, the geographic information, and the depth-image associated information.

In step S660, the three-dimensional map generating apparatus obtains object information including information on at least one object from an object DB including information on shapes and images of a plurality of objects.

In this case, the object DB may include information on a type, a name, a shape, and an image for each of various types of objects. Further, the three-dimensional map generating apparatus may reproduce a three-dimensional outer appearance of the object in a virtual space by combining information on a shape of an arbitrary object and information on an image. In the meantime, information on the shape of the object may include information on a size of the object.

In the meantime, the three-dimensional map generating apparatus may obtain object information on at least one object to be located on the generated three-dimensional map from the object DB. In this case, at least one object to be located on the map may be an object which is actually located in the indoor space or an arbitrary object which is not located in the indoor space.

In another exemplary embodiment, the three-dimensional map generating apparatus may identify an object located in the indoor space using at least one expanded indoor space image.

To this end, the three-dimensional map generating apparatus may utilize an object DB including image and shape information of various objects and utilize features information extracted from the information included in the object DB or the image and shape information of the object to utilize for segmentation or classification of the object.

When it is determined that the identified object does not exist in the object DB or exists in another form, the three-dimensional map generating apparatus may request the user to add or update shape and image information on a new object or a modified object to the object DB.

Alternatively, the three-dimensional map generating apparatus may search objects having the most similar size and shape from the object DB instead of finding the perfectly same object as the identified object. This is because since the background portion of the expanded indoor space image is larger than the background portion of the indoor space image, even though an object which is larger than the object existing in the non-background area is selected from the object DB to be disposed, visual incompatibility is not caused. In contrast, even though an object which is larger than the object existing in the non-background area is selected to be disposed, the background behind the object is built so that there is no data deficiency or awkward portions between the background and the object.

Finally, in step S670, the three-dimensional map generating apparatus adds at least one virtual object corresponding to at least one object to the generated three-dimensional map based on the object information.

That is, the three-dimensional map generating apparatus locates at least one virtual object corresponding to at least one object included in the object information on the three-dimensional map to complete a three-dimensional map including at least one virtual object.

In another exemplary embodiment, when information on a new object is added to the object DB or information on the existing virtual object is updated, the three-dimensional map generating apparatus may selectively update at least one virtual object added to the three-dimensional map.

That is, when a new object is registered or updated in the object DB with a time interval, the three-dimensional map generating apparatus may reflect the registered or updated new information to a virtual object located on the previously generated three-dimensional map. Further, the three-dimensional map generating apparatus repeats the process by a computer algorithm to consistently update the information of the object located on the three-dimensional map without additional effort.

Further, when information on a new object is added to the object DB or information of the existing virtual object is updated, the three-dimensional map generating apparatus may selectively update the information of the virtual object only when the information of the virtual object located on the three-dimensional map needs to be updated.

For example, when the three-dimensional map generating apparatus tries to add an object A on the three-dimensional map, if there is no information on the object A in the object DB, the three-dimensional map generating apparatus may add a virtual object corresponding to an object B similar to the object A on the three-dimensional map. However, when information on the object A is newly added to the object DB thereafter, the three-dimensional map generating apparatus replaces the virtual object corresponding to the object B with the virtual object corresponding to the object A.

Similarly, when information on the object A is updated in the object DB after adding the object A on the three-dimensional map, the three-dimensional map generating apparatus may update the virtual object corresponding to the object A.

In another exemplary embodiment, when a reflective virtual object which is a virtual object including a material which reflects light is included in at least one virtual object, the three-dimensional map generating apparatus may further display a reflected image for the indoor space reflected by the reflective virtual object to the reflective virtual object.

Here, the material which is included in the reflective virtual object to reflect light may include a mirror, a glass, and a metal, but is not limited thereto. Further, the information on the shape and the image of the plurality of objects included in the object DB may further include information on transmittance and an area of the reflective material as well as whether the plurality of objects includes a material which reflects light.

When the reflective virtual object is included in at least one virtual object, the three-dimensional map generating apparatus may display a reflected image reflected through the reflective virtual object with respect to the reference pose corresponding to the reference position of the three-dimensional map on a surface of the reflective virtual object.

For example, the three-dimensional map generating apparatus may further display an image for the indoor space reflected through the reflective virtual object when the user who views the three-dimensional map sees the reflective virtual object with respect to the reference pose, on the surface of the reflective virtual object. This is because the image for the indoor space is not reflected to the reflective virtual object included in the object DB.

To this end, the three-dimensional map generating apparatus may configure new depth-image associated information corresponding to an area of the reflective material included in the reflective virtual object using at least one expanded indoor space image and the geographic information. Alternatively, the three-dimensional map generating apparatus may extract new depth-image associated information corresponding to an area of the reflective material included in the reflective virtual object from the previously generated depth-image associated information.

The three-dimensional map generating apparatus may generate a reflected image to be represented on the reflective material when the user sees the reflective virtual object at the reference pose by considering transmittance of the reflective material based on the new depth-image associated information. Further, the three-dimensional map generating apparatus may represent the reflected image in the area of the reflective material included in the reflective virtual object.

More specifically, when the reflective material is a mirror, the three-dimensional map generating apparatus may generate an image projected on a mirror when the mirror is viewed in an arbitrary position in the indoor space to display the image on the reflective virtual object. Further, when the reflective material is a translucent glass, the three-dimensional map generating apparatus may overlap a reflected image proportional to the transmittance of the translucent glass and the transmitted image when the translucent glass is viewed in an arbitrary position in the indoor space to display the overlapping image on the reflective virtual object.

As described above, when the three-dimensional map generating apparatus updates the reflected image to the reflective virtual object in real time while continuously changing a point of view of the user, an effect that the image of the indoor space projected on the reflective material such as a mirror changes in the same manner as the actual change is assigned, so that a more realistic three-dimensional map may be generated.

Figure 7:
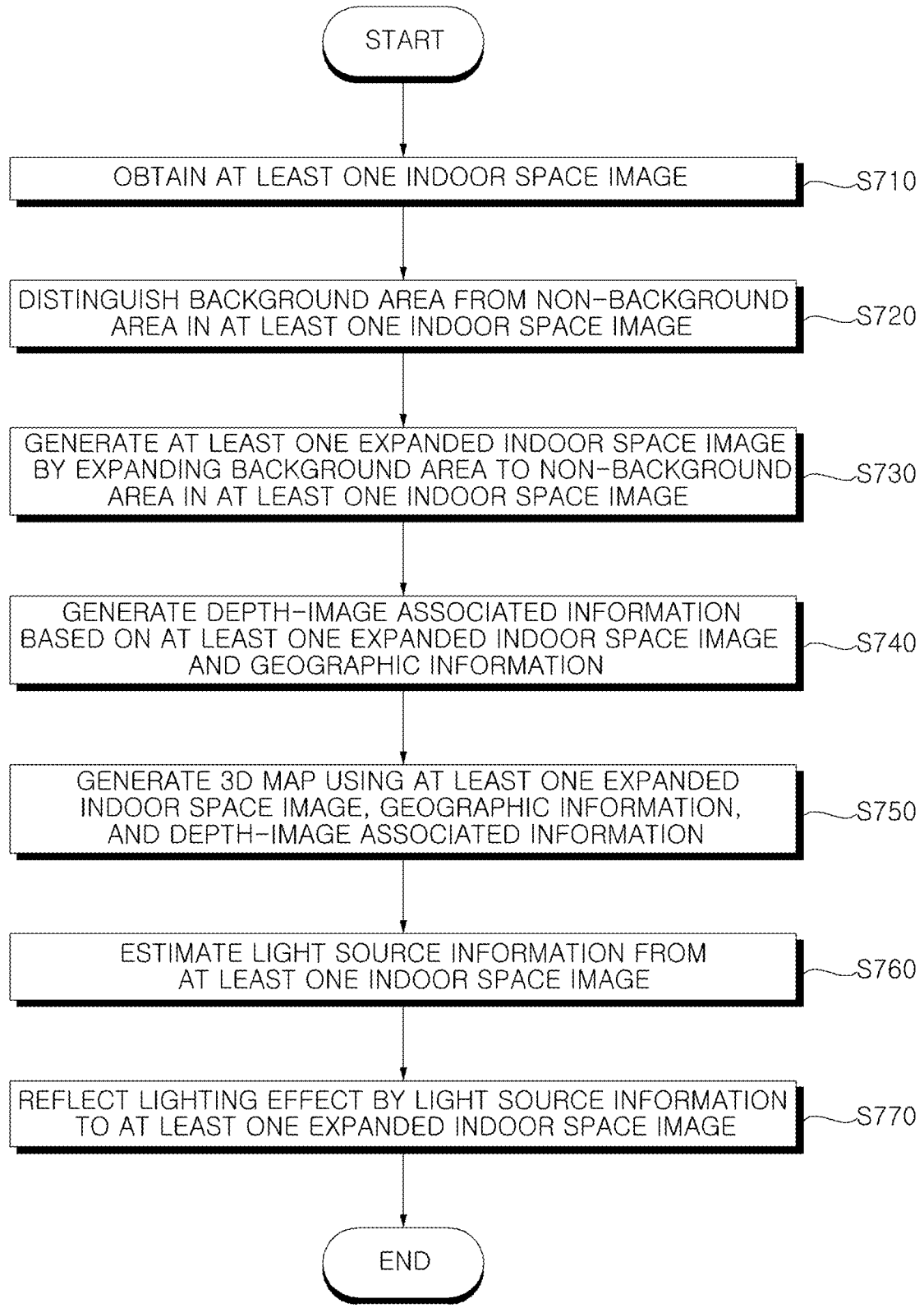
FIG. 7 is a flowchart illustrating a three-dimensional map generating method of an indoor space according to still another exemplary embodiment of the present disclosure.

FIG. 7 is a flowchart illustrating a three-dimensional map generating method of an indoor space according to still another exemplary embodiment of the present disclosure.

In step S710, a three-dimensional map generating apparatus obtains at least one indoor space image which is an image for an indoor space.

In step S720, the three-dimensional map generating apparatus distinguishes a background area corresponding to a structure of the indoor space from a non-background area corresponding to objects located in the indoor space in at least one indoor space image.

In step S730, the three-dimensional map generating apparatus generates at least one expanded indoor space image by expanding the background area to the non-background area in at least one indoor space image.

In step S740, the three-dimensional map generating apparatus generates a depth-image associated information based on at least one expanded indoor space image and geographic information including information of a depth value for the indoor space.

In step S750, the three-dimensional map generating apparatus generates a three-dimensional map for an indoor space using the at least one expanded indoor space image, the geographic information, and the depth-image associated information.

In step S760, the three-dimensional map generating apparatus estimates light source information including information on a position and brightness of a light source located in the indoor space from at least one indoor space image.

That is, the three-dimensional map generating apparatus may estimate a position and brightness of a light source using information of a pixel value included in the image, from at least one indoor space image.

For example, the three-dimensional map generating apparatus may estimate a position corresponding to a pixel value within a predetermined range as a position of the light source from at least one indoor space image and estimate a brightness of the light source in accordance with the pixel value of the estimated location.

Finally, in step S770, the three-dimensional map generating apparatus reflects a lighting effect by the light source information to at least one expanded indoor space image.

For example, during the process of generating an expanded indoor space image by expanding the background area to the non-background area by the three-dimensional map generating apparatus, the lighting effect for the non-background area may disappear. In this case, the three-dimensional map generating apparatus reflects the lighting effect by the light source effect to the expanded indoor space image to generate a more realistic three-dimensional map.

Further, when at least one virtual object is located on the three-dimensional map, the three-dimensional map generating apparatus further adds a shadow for at least one virtual object in accordance with the position and the brightness of the light source included in the light source information to improve realism of the three-dimensional map.

In another exemplary embodiment, when the three-dimensional map generating apparatus reflects the lighting effect to the three-dimensional map, the lighting effect is reflected through a pre-procedure before the user watches the map without reflecting the lighting effect in a real-time environment when the user views the map so that a load in accordance with a real-time lighting effect computation may be reduced.

As a result, when the three-dimensional map generating apparatus configures the three-dimensional map by utilizing one indoor structure outline information and at least one expanded indoor space image, a real-time load proportional to the number of at least one expanded indoor space image may be reduced.

Figure 8:
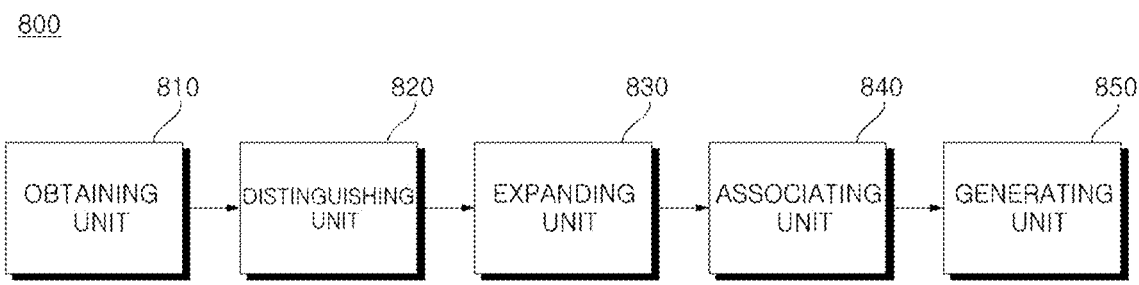
FIG. 8 is a block diagram illustrating a three-dimensional map generating apparatus of an indoor space according to an exemplary embodiment of the present disclosure.

FIG. 8 is a block diagram illustrating a three-dimensional map generating apparatus of an indoor space according to an exemplary embodiment of the present disclosure.

Referring to FIG. 8, a three-dimensional map generating apparatus 800 of an indoor space according to an exemplary embodiment of the present disclosure includes an obtaining unit 810, a distinguishing unit 820, an expanding unit 830, an associating unit 840, and a generating unit 850. Further, the three-dimensional map generating apparatus 800 may further include an outline information generating unit (not illustrated) as an option.

The obtaining unit 810 obtains at least one indoor space image which is an image for an indoor space.

The distinguishing unit 820 distinguishes a background area corresponding to a structure of the indoor space from a non-background area corresponding to objects located in the indoor space in at least one indoor space image.

The expanding unit 830 generates at least one expanded indoor space image by expanding the background area to the non-background area in at least one indoor space image.

The associating unit 840 generates depth-image associated information based on at least one expanded indoor space image and geographic information including information on a depth value for the indoor space.

The generating unit 850 generates a three-dimensional map for the indoor space using the at least one expanded indoor space image, the geographic information, and the depth-image associated information.

Finally, the outline information generating unit (not illustrated) generates indoor space outline information which is outline information for the indoor space using the depth value information.

In another exemplary embodiment, the obtaining unit 810 further obtains depth value information which is information of a depth value for the indoor space and the geographic information may include the depth value information and the indoor space outline information generated by the outline information generating unit (not illustrated).

In another exemplary embodiment, the associating unit 840 updates at least one of the geographic information and the depth-image associated information using at least one expanded indoor space image and features included in the geographic information and the generating unit 850 uses at least one of the updated geographic information and depth-image associated information.

In another exemplary embodiment, the distinguishing unit 820 re-distinguishes the background area and the non-background area using the geographic information and the depth-image associated information in at least one indoor space image, the expanding unit 830 expands the background area in at least one indoor space image to the non-background area to regenerate at least one expanded indoor space image, and the generating unit 850 uses the regenerated at least one expanded indoor space image.

In still another exemplary embodiment, when the distinguishing unit 820 re-distinguishes the background area from the non-background area for one target image of at least one indoor space image, the distinguishing unit may further use the depth-image associated information and at least one supplementary image excluding the target image from at least one indoor space image.

In another exemplary embodiment, the generating unit 850 selects one expanded indoor space image associated with a reference pose corresponding to a predetermined reference position on a three-dimensional map among at least one expanded indoor space image, based on the depth-image associated information and determines the selected expanded indoor space image as a representative image, determines at least one supplementary image excepting the representative image, from at least one expanded indoor space image, using the depth-image associated information and the reference pose, and generates a three-dimensional map using the representative image, at least one supplementary image, the geographic information, and the depth-image associated information.

Figure 9:
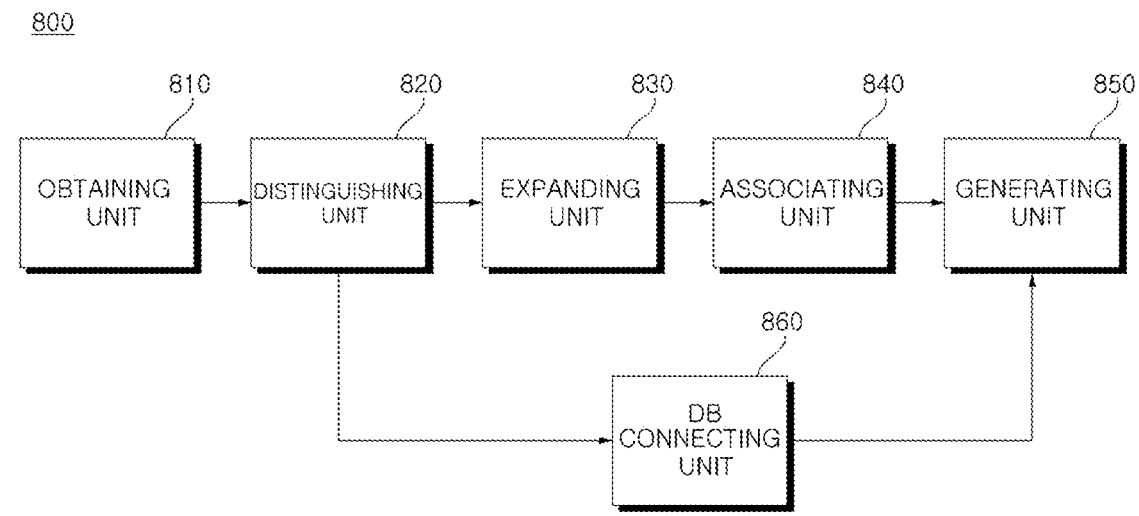
FIG. 9 is a block diagram illustrating a three-dimensional map generating apparatus of an indoor space according to another exemplary embodiment of the present disclosure.

FIG. 9 is a block diagram illustrating a three-dimensional map generating apparatus of an indoor space according to another exemplary embodiment of the present disclosure.

Referring to FIG. 9, a three-dimensional map generating apparatus 800 of an indoor space according to an exemplary embodiment of the present disclosure includes an obtaining unit 810, a distinguishing unit 820, an expanding unit 830, an associating unit 840, a generating unit 850, and a DB connecting unit 860.

The obtaining unit 810 obtains at least one indoor space image which is an image for an indoor space.

The distinguishing unit 820 distinguishes a background area corresponding to a structure of the indoor space from a non-background area corresponding to objects located in the indoor space in at least one indoor space image.

The expanding unit 830 generates at least one expanded indoor space image by expanding the background area to the non-background area in at least one indoor space image.

The associating unit 840 generates depth-image associated information based on at least one expanded indoor space image and geographic information including information on a depth value for the indoor space.

The generating unit 850 generates a three-dimensional map for the indoor space using the at least one expanded indoor space image, the geographic information, and the depth-image associated information.

Finally, the DB connecting unit 860 obtains object information including information on at least one object from an object DB including information on shapes and images of a plurality of objects.

In another exemplary embodiment, the generating unit 850 may add at least one virtual object corresponding to at least one object on the generated three-dimensional map, based on the object information.

In another exemplary embodiment, the object information may be information on an object located in the indoor space.

In another exemplary embodiment, when information on a new object is added to the object DB or information on the existing virtual object is updated, the generating unit 850 may selectively update at least one virtual object added to the three-dimensional map. In another exemplary embodiment, when a reflective virtual object which is a virtual object including a material which reflects light is included in at least one virtual object, the generating unit 850 may further display a reflected image which is an image for an indoor space which is reflected by the reflective virtual object with respect to the reference pose corresponding to a predetermined reference position on the three-dimensional map in the reflective virtual object using at least one expanded indoor space image and the geographic information.

Figure 10:
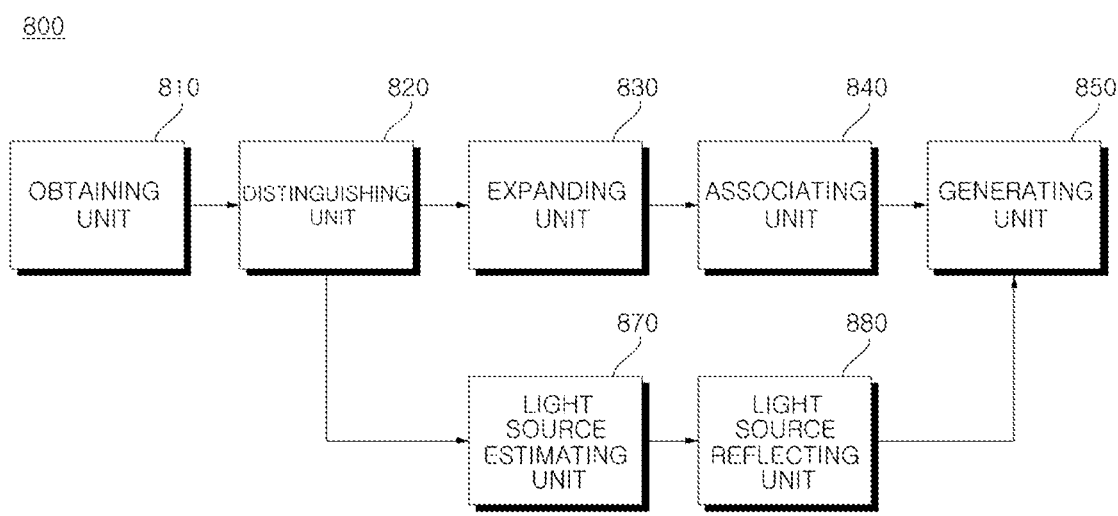
FIG. 10 is a block diagram illustrating a three-dimensional map generating apparatus of an indoor space according to still another exemplary embodiment of the present disclosure.

FIG. 10 is a block diagram illustrating a three-dimensional map generating apparatus of an indoor space according to still another exemplary embodiment of the present disclosure.

Referring to FIG. 10, a three-dimensional map generating apparatus 800 of an indoor space according to an exemplary embodiment of the present disclosure includes an obtaining unit 810, a distinguishing unit 820, an expanding unit 830, an associating unit 840, a generating unit 850, a light source estimating unit 870, and a light source reflecting unit 880.

The obtaining unit 810 obtains at least one indoor space image which is an image for an indoor space.

The distinguishing unit 820 distinguishes a background area corresponding to a structure of the indoor space from a non-background area corresponding to objects located in the indoor space in at least one indoor space image.

The expanding unit 830 generates at least one expanded indoor space image by expanding the background area to the non-background area in at least one indoor space image.

The associating unit 840 generates depth-image associated information based on at least one expanded indoor space image and geographic information including information on a depth value for the indoor space.

The generating unit 850 generates a three-dimensional map for the indoor space using the at least one expanded indoor space image, the geographic information, and the depth-image associated information.

The light source estimating unit 870 estimates light source information including information on a position and a brightness for a light source located in the indoor space from at least one indoor space image.

Finally, the light source reflecting unit 880 reflects a lighting effect by the light source information to at least one expanded indoor space image.

The above-described exemplary embodiments of the present invention may be created by a computer-executable program and implemented in a general use digital computer which operates the program using a computer-readable recording medium.

The computer-readable recording medium includes a magnetic storage medium (for example, a ROM, a floppy disk, and a hard disk) and an optical reading medium (for example, CD-ROM and a DVD).

For now, the present invention has been described with reference to the exemplary embodiments. It is understood to those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

What is claimed is:

1. A three-dimensional map generating method of an indoor space, comprising:
    obtaining at least one indoor space image which is an image for an indoor space;
    dividing the at least one indoor space image into a background area corresponding to a structure of the indoor space and a non-background area corresponding to objects located in the indoor space;
    generating at least one background image by removing the non-background area in the at least one indoor space image;
    generating at least one expanded indoor space image by expanding the background area to the removed non-background area in the at least one background image based on a three-dimensional geographic information of the background area;
    generating a depth-image associated information based on the at least one expanded indoor space image and the three-dimensional geographic information including information of a depth value for the indoor space;
    generating at least one re-expanded indoor space image by mapping a boundary line corresponding to the same plane in the 3D geographic information to an image through the depth-image associated information and dividing an inside of the removed non-background area into multi-areas based on the boundary line, and re-expanding the background area to the removed non-background area based on the multi-areas; and
    generating a three-dimensional map for the indoor space using the at least one expanded indoor space image, the three-dimensional geographic information, and the depth-image associated information.

2. The three-dimensional map generating method according to claim 1, further comprising:
    before the dividing the at least one indoor space image, obtaining depth value information which is information of a depth value for the indoor space; and
    generating indoor space outline information which is outline information for the indoor space using the depth value information,
    wherein the three-dimensional geographic information includes the depth value information and the indoor space outline information.

3. The three-dimensional map generating method according to claim 1, further comprising:
    after the generating of depth-image associated information,
    updating at least one of the three-dimensional geographic information and the depth-image associated information using the at least one expanded indoor space image and features included in the three-dimensional geographic information, wherein the generating of a three-dimensional map uses at least one of the updated three-dimensional geographic information and depth-image associated information.

4. The three-dimensional map generating method according to claim 1, further comprising:

between the generating of depth-image associated information and the generating of a three-dimensional map for the indoor space, re-dividing the at least one indoor space image into the background area and the non-background area using the three-dimensional geographic information and the depth-image associated information; and regenerating at least one expanded indoor space image by expanding the background area to the non-background area in the at least one indoor space image;

wherein the generating of a three-dimensional map uses the regenerated at least one expanded indoor space image.

5. The three-dimensional map generating method according to claim 4, wherein in the re-dividing the background area and the non-background area, when the background area and the non-background area are re-divided for one target image among the at least one indoor space image, the depth-image associated information and at least one supplementary image excluding the target image from the at least one indoor space image are further used.

6. The three-dimensional map generating method according to claim 1, wherein the generating of a three-dimensional map for the indoor space includes:

selecting one expanded indoor space image associated with a reference pose corresponding to a predetermined reference position on the three-dimensional map among the at least one expanded indoor space image, based on the depth-image associated information to determine the selected expanded indoor space image as a representative image;

determining at least one supplementary image excepting the representative image among the at least one expanded indoor space image, using the depth-image associated information and the reference pose; and generating a three-dimensional map using the representative image, the at least one supplementary image, the three-dimensional geographic information, and the depth-image associated information.

7. The three-dimensional map generating method according to claim 6, further comprising:

displaying a reflected image which is an image for the indoor space which is reflected by a reflective virtual object with respect to the reference pose corresponding to a predetermined reference position on the three-dimensional map in the reflective virtual object using the at least one expanded indoor space image and the three-dimensional geographic information when the reflective virtual object which is a virtual object including a material which reflects light is included in the at least one virtual object.

8. The three-dimensional map generating method according to claim 1, further comprising:

obtaining object information including information on at least one object from an object DB (Database) including information on shapes and images of a plurality of objects; and adding at least one virtual object corresponding to the at least one object on the generated three-dimensional map, based on the object information.

9. The three-dimensional map generating method according to claim 8, wherein the object information is information on an object located in the indoor space.

10. The three-dimensional map generating method according to claim 8, further comprising:

selectively updating the at least one virtual object added to the three-dimensional map when information on a new object is added to the object DB or information on the existing virtual object is updated.

11. The three-dimensional map generating method according to claim 1, further comprising:

estimating light source information including information on a position and brightness of a light source located in the indoor space from the at least one indoor space image; and reflecting a lighting effect by the light source information to the at least one expanded indoor space image.

12. A three-dimensional map generating apparatus of an indoor space, comprising:

an obtaining unit which obtains at least one indoor space image which is an image for an indoor space;

a dividing unit which divides the at least one indoor space image into a background area corresponding to a structure of the indoor space and a non-background area corresponding to objects located in the indoor space;

an expanding unit which generates at least one background image by removing the non-background area in the at least one indoor space image, and generates at least one expanded indoor space image by expanding the background area to the removed non-background area in the at least one background image based on a three-dimensional geographic information of the background area;

an associating unit which generates depth-image associated information based on the at least one expanded indoor space image and the three-dimensional geographic information including information of a depth value for the indoor space; and a generating unit which generates a three-dimensional map for the indoor space using the at least one expanded indoor space image, the three-dimensional geographic information, and the depth-image associated information, wherein the expanding unit maps a boundary line corresponding to the same plane in the three-dimensional geographic information to an image through the depth-image associated information, divides an inside of the removed non-background area into multi-areas based on the boundary line, and re-expands the background area to the removed non-background area based on the multi-areas.

13. The three-dimensional map generating apparatus according to claim 12, wherein the obtaining unit further obtains depth value information which is information of a depth value for the indoor space, an outline information generating unit which generates indoor space outline information which is outline information for the indoor space using the depth value information is further provided, and the three-dimensional geographic information includes the depth value information and the indoor space outline information.

14. The three-dimensional map generating apparatus according to claim 12, wherein the associating unit updates at least one of the three-dimensional geographic information and the depth-image associated information using the at least one expanded indoor space image and features included in the three-dimensional geographic information and the generating unit uses at least one of the updated three-dimensional geographic information and the updated depth-image associated information.

15. The three-dimensional map generating apparatus according to claim 12, wherein the dividing unit re-divides the at least one indoor space image into the background area and the non-background area using the three-dimensional geographic information and the depth-image associated information, the expanding unit regenerates the at least one expanded indoor space image by expanding the background area to the non-background area in the at least one indoor space image, and the generating unit uses the regenerated at least one expanded indoor space image.

16. The three-dimensional map generating apparatus according to claim 15, wherein when the dividing unit re-divides the background area and the non-background area for one target image among the at least one indoor space image, the dividing unit further uses the depth-image associated information and at least one supplementary image excluding the target image from the at least one indoor space image.

17. The three-dimensional map generating apparatus according to claim 12, wherein the generating unit selects one expanded indoor space image associated with a reference pose corresponding to a predetermined reference position on the three-dimensional map among the at least one expanded indoor space image, based on the depth-image associated information to determine the selected expanded indoor space image as a representative image; determines at least one supplementary image excepting the representative image, from the at least one expanded indoor space image, using the depth-image associated information and the reference pose; and generates a three-dimensional map using the representative image, the at least one supplementary image, the three-dimensional geographic information, and the depth-image associated information.

18. The three-dimensional map generating apparatus according to claim 17, wherein when a reflective virtual object which is a virtual object including a material which reflects light is included in the at least one virtual object, the generating unit further displays a reflected image which is an image for the indoor space which is reflected by the reflective virtual object with respect to the reference pose corresponding to a predetermined reference position on the three-dimensional map in the reflective virtual object using the at least one expanded indoor space image and the three-dimensional geographic information.

19. The three-dimensional map generating apparatus according to claim 12, further comprising:
a DB (Database) connecting unit which obtains object information including information on at least one object from an object DB including information on shapes and images of a plurality of objects,
wherein the generating unit adds at least one virtual object corresponding to the at least one object on the generated three-dimensional map, based on the object information.

20. The three-dimensional map generating apparatus according to claim 19, wherein the object information is information on an object located in the indoor space.

21. The three-dimensional map generating apparatus according to claim 19, wherein when information on a new object is added to the object DB or information on an existing virtual object is updated, the generating unit selectively updates the at least one virtual object added to the three-dimensional map.

22. The three-dimensional map generating apparatus according to claim 12, further comprising:
a light source estimating unit which estimates light source information including information on a position and brightness of a light source located in the indoor space from the at least one indoor space image; and
a light source reflecting unit which reflects a lighting effect by the light source information to the at least one expanded indoor space image.

\* \* \* \* \*